(12) United States Patent
Popovich et al.

(10) Patent No.: US 6,646,772 B1
(45) Date of Patent: *Nov. 11, 2003

(54) HOLOGRAPHIC ILLUMINATION SYSTEM

(75) Inventors: Milan M. Popovich, Leicester (GB); Jonathan D. Waldern, Los Hills, CA (US); John J. Storey, Wollaton (GB)

(73) Assignee: DigiLens, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/054,319

(22) Filed: Nov. 13, 2001

Related U.S. Application Data

(60) Continuation-in-part of application No. 09/805,817, filed on Mar. 14, 2001, now Pat. No. 6,317,228, which is a division of application No. 09/607,432, filed on Jun. 30, 2000, now Pat. No. 6,211,976, which is a division of application No. 09/395,889, filed on Sep. 14, 1999, now Pat. No. 6,115,152.
(60) Provisional application No. 60/255,820, filed on Dec. 15, 2000.

(51) Int. Cl.[7] .................................................. G02B 5/32
(52) U.S. Cl. ........................ 359/15; 359/1; 359/22; 359/24; 353/30; 353/31; 349/201
(58) Field of Search ............................ 359/15, 22, 24, 359/13; 353/30, 31, 74; 349/201, 202

(56) References Cited

U.S. PATENT DOCUMENTS

| | | | | | |
|---|---|---|---|---|---|
| 5,868,480 A | * | 2/1999 | Zeinali | ........................ | 359/31 |
| 5,894,359 A | * | 4/1999 | Suzuki | ........................ | 353/15 |
| 5,942,157 A | * | 8/1999 | Sutherland | .................... | 359/15 |
| 6,317,228 B2 | * | 11/2001 | Popovich | ..................... | 359/15 |
| 6,323,970 B1 | * | 11/2001 | Popovich | ..................... | 359/15 |

* cited by examiner

*Primary Examiner*—John Juba
*Assistant Examiner*—Leo Boutsikaris
(74) *Attorney, Agent, or Firm*—Campbell Stephenson Ascolese LLP

(57) ABSTRACT

Disclosed is an apparatus and method of illuminating an image display via an electrically switchable holographic optical element. The method includes a first electrically switchable holographic optical element (ESHOE) receiving illumination light. The first ESHOE comprises oppositely facing front and back surfaces. The first ESHOE focuses a first component (e.g., p-polarized blue light) of the illumination light while transmitting the remaining components of the illumination light without substantial alteration. An image display is provided and receives the focused first component. In response to receiving the focused first component, the image display emits image light. The first ESHOE receives and transmits this image light without substantial alteration. In one embodiment, the focused first component emerges from the first ESHOE at the back surface thereof, and the first ESHOE receives the image light at the back surface.

14 Claims, 19 Drawing Sheets

SLANTED
TRANSMISSION

SLANTED
REFLECTION

LIGHT TRANSMITTED

LIGHT BLOCKED

TRANSMITTED

RETRO-REFLECTED

UNSWITCHED STATE

SWITCHED STATE

HOLOGRAPHIC ILLUMINATION SYSTEM

RELATED APPLICATIONS

This application is a continuation-in-part of and claims priority to U.S patent application Ser. No. 09/805,817, filed Mar. 14, 2001, now issued as U.S. Pat. No. 6,317,228, which is a divisional of U.S. application Ser. No. 09/607,432 filed Jun. 30, 2000, now U.S. Pat. No. 6,211,976, which is a divisional of U.S. application Ser. No. 09/395,889 filed Sep. 14, 1999, now issued as U.S. Pat. No. 6,115,152, and claims priority to Provisional Application Ser. No. 60/255,820 filed Dec. 15, 2000.

BACKGROUND OF THE INVENTION

1. Field of the Invention

The invention relates generally to illumination systems, and particularly to illumination systems employing one or more switchable holographic optical elements for use in illuminating an image display.

2. Description of the Related Art

Image displays are employed in projective display systems. Projective display systems are a growing technology in the market of televisions and digital monitors. Projective displays use images focussed onto a diffuser to present an image to a user. The projection may be done from the same side of the diffuser as the user, as in the case of cinema projectors, or from the opposite side. The image is typically generated on one or more "displays"—a miniature LCD device that reflects or transmits light in a pattern formed by switchable pixels. The LCD displays are generally fabricated with microelectronics processing techniques. Each pixel in the display is a region whose reflective or transmissive properties can be controlled by an electrical signal. In an LCD display, light incident on a particular pixel is either reflected, partially reflected, or blocked by the pixel, depending on the signal applied to that pixel. In some cases, LCD displays are transmissive devices where the transmission through any pixel can be varied in steps (gray levels) over a range extending from a state where light is substantially blocked to the state in which incident light is substantially transmitted. More recently, displays have also been constructed from micro-electromechanical devices (MEMs) that incorporate small movable mirrors. The mirrors, one or more at each pixel, control whether or not light is reflected into an output direction.

When a uniform beam of light is reflected from (or transmitted through) a display, the beam gains a spatial intensity profile that depends on the transmission state of the pixels. An image is formed at the LCD by adjusting the transmission (or gray level) of the pixels to correspond to a desired image. This image can be imaged onto a diffusing screen for direct viewing or alternatively it can be imaged onto some intermediate image surface from which it can be magnified by an eye-piece to give a virtual image, as for example in a wearable display.

The displays are generally monochromatic devices: each pixel is either "on" or "off" or set to an intermediate intensity level. The display typically cannot individually control the intensity of more than one color component of the image. To provide color control, a display system may use three independent LCD displays. Each of the three LCD displays is illuminated by a separate light source with spectral components that stimulate one of the three types of cones in the human eye. The three displays each reflect (or transmit) a beam of light that makes one color component of a color image. The three beams are then combined through prisms, a system of dichroic filters, and/or other optical elements into a single chromatic image beam.

Another method of generating a full color image, which eliminates the problems of combining the beams from three separate displays is to sequentially illuminate a single monochromatic display that is updated with the appropriate primary color components of the image.

The displays can be configured as arrays of red, green, and blue pixels that are illuminated by white light with arrays of color filters being used to illuminate each pixel with the appropriate color. However, generating a color image in this manner will reduce image resolution since only one third of the pixels are available for each primary color.

A significant part of the design considerations for these systems involves the choices of light sources and provisions for effective control over the relative intensities of the light sources. This control is required to allow effective color balancing during initial calibrations as well as during operation.

Holograms essentially generate predetermined wavefronts by means of diffractive structures recorded inside hologram mediums. A hologram may be used to reproduce the effects of a particular optical element, such as a lens or a mirror. In certain cases, where complex optical operations are not being reproduced, "holographic optical elements" (HOEs) may be based on simple diffraction gratings. These HOEs may be far easier and less expensive to produce than their glass counterparts, especially when the optical element is complicated or must meet stringent tolerances. HOEs can be compact, lightweight and wavelength specific which allows more flexibility in designing optical systems. HOEs may be used to replace individual optical elements, groups of elements and in some case entire systems of conventional optical components.

SUMMARY

Disclosed is an apparatus and method of illuminating an image display via an electrically switchable holographic optical element. The method includes a first electrically switchable holographic optical element (ESHOE) receiving illumination light. The first ESHOE comprises oppositely facing front and back surfaces. The first ESHOE focuses a first component (e.g., p-polarized blue light) of the illumination light while transmitting the remaining components of the illumination light without substantial alteration. An image display is provided and receives the focused first component. In response to receiving the focused first component, the image display emits image light. The first ESHOE receives and transmits this image light without substantial alteration. In one embodiment, the focused first component emerges from the first ESHOE at the back surface thereof, and the first ESHOE receives the image light at the back surface.

BRIEF DESCRIPTION OF THE DRAWINGS

Objects and advantages of the invention will become apparent upon reading the following detailed description and upon reference to the accompanying drawings in which:

FIGS. 21b and 21c illustrate operational aspects of one embodiment of the system shown in FIG. 21a;

FIG. 21d illustrates operational aspects of another embodiment of the system shown in FIG. 21a.

Figure 1:
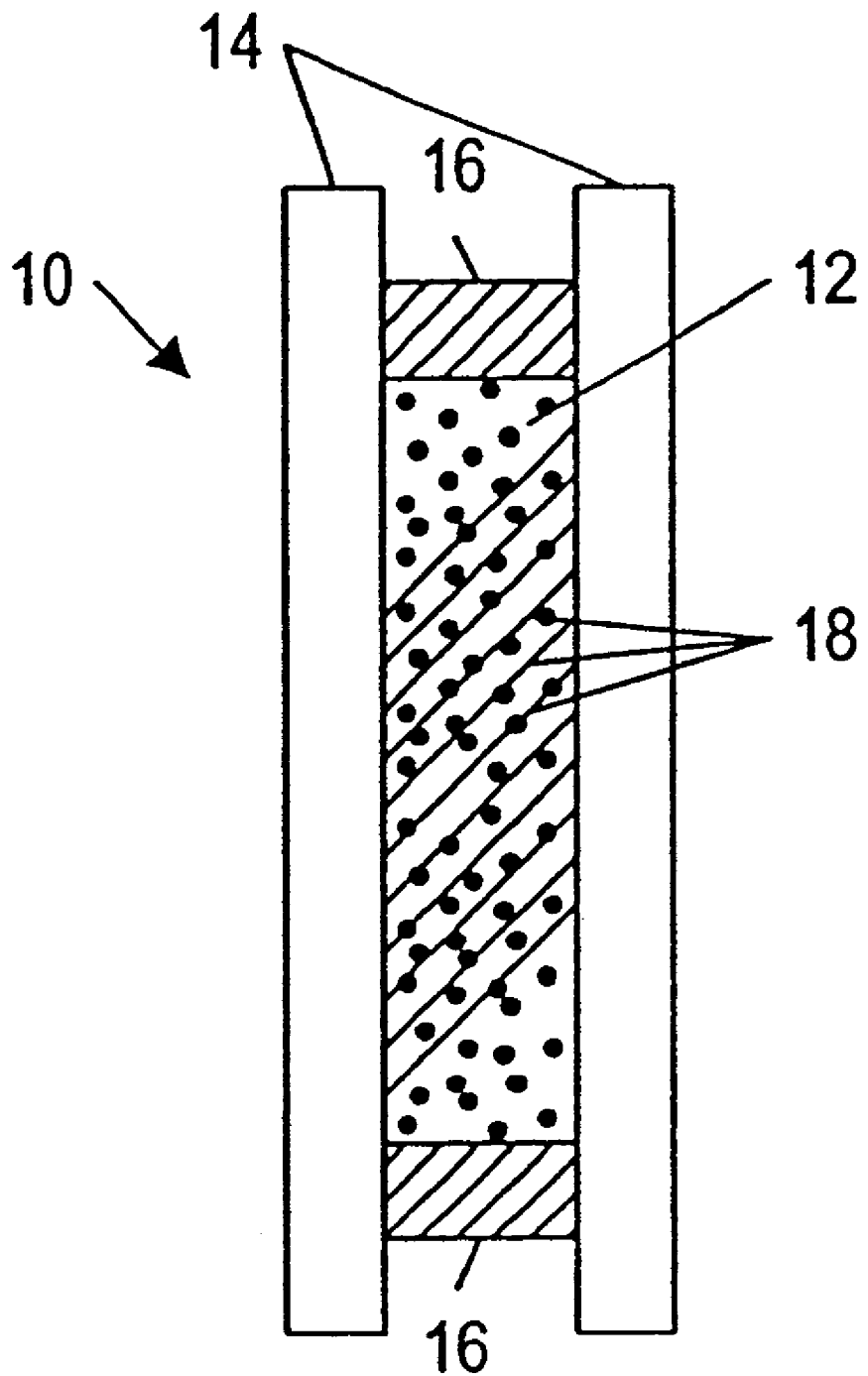
FIG. 1 is a cross-sectional view of an electrically switchable hologram made of an exposed polymer-dispersed liquid crystal (PDLC) material.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, that the intention is to cover all modifications, equivalents and alternatives falling within the spirit and scope of the present invention as defined by the claims set forth below.

DETAILED DESCRIPTION

Holographic optical elements (HOEs) enable the construction of several types of illumination systems. These systems may be used to combine light sources of different colors to provide polychromatic or "white"-light illumination. The introduction of switchable (or "reconfigurable") HOEs allows intensity control over individual color components of the white light. Switchable HOEs can also be employed in systems that generate color images through color-sequential illumination of monochromatic image displays (or "video displays").

FIGS. 1–17: Switchable Hologram Materials and Devices

Holographic optical elements are formed, in one embodiment, from a polymer dispersed liquid crystal (PDLC) material comprising a monomer, a dispersed liquid crystal, a cross-linking monomer, a coinitiator and a photoinitiator dye. These PDLC materials exhibit clear and orderly separation of the liquid crystal and cured polymer, whereby the PDLC material advantageously provides high quality optical elements. The PDLC materials used in the holographic optical elements may be formed in a single step.

The holographic optical elements may also use a unique photopolymerizable prepolymer material that permits in situ control over characteristics of resulting gratings, such as domain size, shape, density, ordering and the like. Furthermore, methods and materials taught herein can be used to prepare PDLC materials for optical elements comprising switchable transmission or reflection type holographic gratings.

Polymer dispersed liquid crystal materials, methods, and devices contemplated for use in the present invention are also described in R. L. Sutherland et al., "Bragg Gratings in an Acrylate Polymer Consisting of Periodic Polymer dispersed Liquid-Crystal Planes," *Chemistry of Materials*, No. 5, pp. 1533–1538 (1993); in R. L. Sutherland et al., "Electrically switchable volume gratings in polymer dispersed liquid crystals," *Applied Physics Letters*, Vol. 64, No. 9, pp. 1074–1076 (1994); and T. J. Bunning et al., "The Morphology and Performance of Holographic Transmission Gratings Recorded in Polymer dispersed Liquid Crystals," *Polymer*, Vol. 36, No. 14, pp. 2699–2708 (1995), all of which are fully incorporated by reference into this Detailed Description. U.S. patent application Ser. No. 08/273,436 and U.S. Pat. No. 5,698,343 to Sutherland et al., titled "Switchable Volume Hologram and Devices," and "Laser Wavelength Detection and Energy Dosimetry Badge," respectively, are also incorporated by reference and include background material on the formation of transmission gratings inside volume holograms.

In one embodiment, the process of forming a hologram is controlled primarily by the choice of components used to prepare the homogeneous starting mixture, and to a lesser extent by the intensity of the incident light pattern. In one embodiment, the polymer dispersed liquid crystal (PDLC) material employed in the present invention creates a switchable hologram in a single step. A feature of one embodiment of PDLC material is that illumination by an inhomogeneous, coherent light pattern initiates a patterned, anisotropic diffusion (or counter diffusion) of polymerizable monomer and second phase material, particularly liquid crystal (LC). Thus, alternating well-defined channels of second phase-rich material, separated by well-defined channels of a nearly pure polymer, can be produced in a single-stop process.

The resulting PDLC material may have an anisotropic spatial distribution of phase-separated LC droplets within the photochemically cured polymer matrix. Prior art PDLC materials made by a single-step process can achieve at best only regions of larger LC bubbles and smaller LC bubbles in a polymer matrix. The large bubble sizes are highly scattering which produces a hazy appearance and multiple ordering diffractions, in contrast to the well-defined first order diffraction and zero order diffraction made possible by the small LC bubbles of one embodiment of PDLC material in well-defined channels of LC-rich material. Reasonably well-defined alternately LC-rich channels and nearly pure polymer channels in a PDLC material are possible by multi-step processes, but such processes do not achieve the precise morphology control over LC droplet size and distribution of sizes and widths of the polymer and LC-rich channels made possible by one embodiment of PDLC material.

The same may be prepared by coating the mixture between two indium-tin-oxide (ITO) coated glass slides separated by spacers of nominally 10–20 $\mu$m thickness. The sample is placed in a conventional holographic recording setup. Gratings are typically recorded using the 488 nm line of an argon ion laser with intensities of between about 0.1–100 mW/cm$^2$ and typical exposure times of 30–120 seconds. The angle between the two beams is varied to vary the spacing of the intensity peaks, and hence the resulting grating spacing of the hologram. Photopolymerization is induced by the optical intensity pattern. A more detailed discussion of exemplary recording apparatus can be found in R. L. Sutherland, et al., "Switchable holograms in new photopolymer-liquid crystal composite materials," Society of Photo-Optical Instrumentation Engineers (SPIE), Proceedings Reprint, Volume 2402, reprinted from *Diffractive and Holographic Optics Technology II* (1995), incorporated herein by reference.

The features of the PDLC material are influenced by the components used in the preparation of the homogeneous starting mixture and, to a lesser extent, by the intensity of the incident light pattern. In one embodiment, the prepolymer material comprises a mixture of a photopolymerizable monomer, a second phase material, a photoinitiator dye, a coinitiator, a chain extender (or cross-linker), and, optionally, a surfactant.

In one embodiment, two major components of the prepolymer mixture are the polymerizable monomer and the second phase material, which are preferably completely miscible. Highly functionalized monomers may be preferred because they form densely cross-linked networks which shrink to some extent and to tend to squeeze out the second phase material. As a result, the second phase material is moved anisotropically out of the polymer region and, thereby, separated into well-defined polymer-poor, second phase-rich regions or domains. Highly functionalized monomers may also be preferred because the extensive cross-linking associated with such monomers yields fast kinetics, allowing the hologram to form relatively quickly, whereby the second phase material will exist in domains of less than approximately 0.1 $\mu$m.

Highly functionalized monomers, however, are relatively viscous. As a result, these monomers do not tend to mix well with other materials, and they are difficult to spread into thin films. Accordingly, it is preferable to utilize a mixture of penta-acrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetracrylate, pentaerythritol pentacrylate, and the like can be used. In one embodiment, it has been found that an approximately 1:4 mixture of tri- to penta-acrylate facilitates homogeneous mixing while providing a favorable mixture for forming 10–20 $\mu$m films on the optical plates.

The second phase material of choice is a liquid crystal (LC). This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention may include the mixture of cyanobiphenyls marketed as E7 by Merck, 4'-n-pentyl-4-cyanobiphenyl, 4'-n-heptyl-4- cyanobiphenyl, 4'-octaoxy-4-cyanobiphenyl, 4'-pentyl-4-cyanoterphenyl, α-methoxybenzylidene-4'-butylaniline, and the like. Other second phase components are also possible.

The polymer dispersed liquid crystal material employed in the practice of the present invention may be formed from a prepolymer material that is a homogeneous mixture of a polymerizable monomer comprising dipentaerythritol hydroxypentacrylate (available, for example, from Polysciences, Inc., Warrington, Pa.), approximately 10–40 wt % of the liquid crystal E7 (which is a mixture of cyanobiphenyls marketed as E7 by Merck and also available from BDH Chemicals, Ltd., London, England), the chain-extending monomer N-vinylp-yrrolidinone ("NVP") (available from the Aldrich Chemical Company, Milwaukee, Wis., coinitiator N-phenylglycine ("NPG") (also available from the Aldrich Chemical Company, Milwaukee, Wis.), and the photoinitiator dye rose bengal ester; (2,4,5,7-tetraiodo-3',4',5',6'-tetrachlorofluorescein-6-acetate ester) marketed as RBAX by Spectragraph, Ltd., Maumee, Ohio). Rose bengal is also available as rose bengal sodium salt (which must be esterified for solubility) from the Aldrich Chemical Company. This system has a very fast curing speed which results in the formation of small liquid crystal micro-droplets.

The mixture of liquid crystal and prepolymer material are homogenized to a viscous solution by suitable means (e.g., ultrasonification) and spread between indium-tin-oxide (ITO) coated glass sides with spacers of nominally 15–100 $\mu$m thickness and, preferably, 10–20 $\mu$m thickness. The ITO is electrically conductive and serves as an optically transparent electrode. Preparation, mixing and transfer of the prepolymer material onto the glass slides are preferably done in the dark as the mixture is extremely sensitive to light.

The sensitivity of the prepolymer materials to light intensity is dependent on the photoinitiator dye and its concentration. A higher dye concentration leads to a higher sensitivity. In most cases, however, the solubility of the photoinitiator dye limits the concentration of the dye and, thus, the sensitivity of the prepolymer material. Nevertheless, it has been found that for more general applications, photoinitiator dye concentrations in the range of 0.2–0.4% by weight are sufficient to achieve desirable sensitivities and allow for a complete bleaching of the dye in the recording process, resulting in colorless final samples. Photoinitiator dyes that may be useful in generating PDLC materials are rose bengal ester (2,4,5,7-tetraiodo-3',4',5',6'-tetrachlorofluorescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600–900 nm as well as merocyanine dyes derived from spiropyran may also find utility in the present invention.

The coinitiator employed in the formulation of the hologram controls the rate of curing in the free radical polymerization reaction of the prepolymer material. Optimum phase separation and, thus, optimum diffraction efficiency in the resulting PDLC material, are a function of curing rate. It has been found that favorable results can be achieved utilizing coinitiator in the range of 2–3% by weight. Suitable coinitiators include N-phenylglycine; triethyl amine; triethanolamine; N,N-dimethyl-2,6-diisopropyl aniline, and the like.

Other suitable dyes and dye coinitiator combinations that may be suitable for use in producing holographic optical elements, particularly for visible light, include eosin and triethanolamine; camphorquinone and N-phenylglycine; fluorescein and triethanolamine; methylene blue and triethanolamine or N-phenylglycine; erythrosin B and triethanolamine; indolinocarbocyanine and triphenyl borate; iodobenzospiropyran and triethylamine, and the like.

The chain extender (or cross linker) employed in creating holographic optical elements may help to increase the solubility of the components in the prepolymer material as well as increase the speed of polymerization. The chain extender is preferably a smaller vinyl monomer as compared with the pentacrylate, whereby it can react with the acrylate positions in the pentacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that chain extender in general applications in the range of 10–18% by weight maximizes the performance in terms of diffraction efficiency. In the one embodiment, it is expected that suitable chain extenders can be selected from the following: N-vinylpyrrolidinone; N-vinyl pyridine; acrylonitrile; N-vinyl carbazole, and the like.

It has been found that the addition of a surfactant material, namely, octanoic acid, in the prepolymer material lowers the switching voltage and also improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phase-separated LC droplets. SEM studies have shown that droplet sizes in PDLC materials including surfactants are reduced to the range of 30–50 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include octanoic acid; heptanoic acid; hexanoic acid; dodecanoic acid; decanoic acid, and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") $C_8H_{17}CO_2CH=CH_2$, commercially available from the Aldrich Chemical Co. in Milwaukee, Wis. Favorable results have also been obtained where the chain extender N-vinylpyrrolidinone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and the resulting gratings could be electrically switched by an applied field of 6V/$\mu$m.

PDLC materials may also be formed using a liquid crystalline bifunctional acrylate as the monomer ("LC monomer"). LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCD in the PDLC material greatly lowers the switching voltages (e.g., to ~2V/$\mu$m). Another advantage of using LC monomers is that it is possible to apply low AC or DC fields while recording holograms to pre-align the host LC monomers and low molecular weight LC so that a desired orientation and configuration of the nematic directors can be obtained in the LC droplets. The chemical formulate of several suitable LC monomers are as follows:

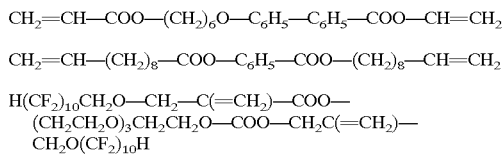

Semifluorinated polymers are known to show weaker anchoring properties and also significantly reduced switching fields. Thus, it is believed that semifluorinated acrylate monomers which are bifunctional and liquid crystalline may find suitable application in the formulation of holograms.

Referring now to FIG. 1, there is shown a cross-sectional view of an electrically switchable hologram 10 made of an exposed polymer dispersed liquid crystal material made according to the teachings of this description. A layer 12 of the polymer dispersed liquid crystal material is sandwiched between a pair of indium-tin-oxide coated glass slides 14 and spacers 16. The interior of hologram 10 shows Bragg transmission gratings 18 formed when layer 12 was exposed to an interference pattern from two intersecting beams of coherent laser light. The exposure times and intensities can be varied depending on the diffraction efficiency and liquid crystal domain size desired. Liquid crystal domain size can be controlled by varying the concentrations of photoinitiator, coinitiator and chain-extending (or cross-linking) agent. The orientation of the nematic directors can be controlled while the gratings are being recorded by application of an external electric field across the ITO electrodes.

Figure 2:
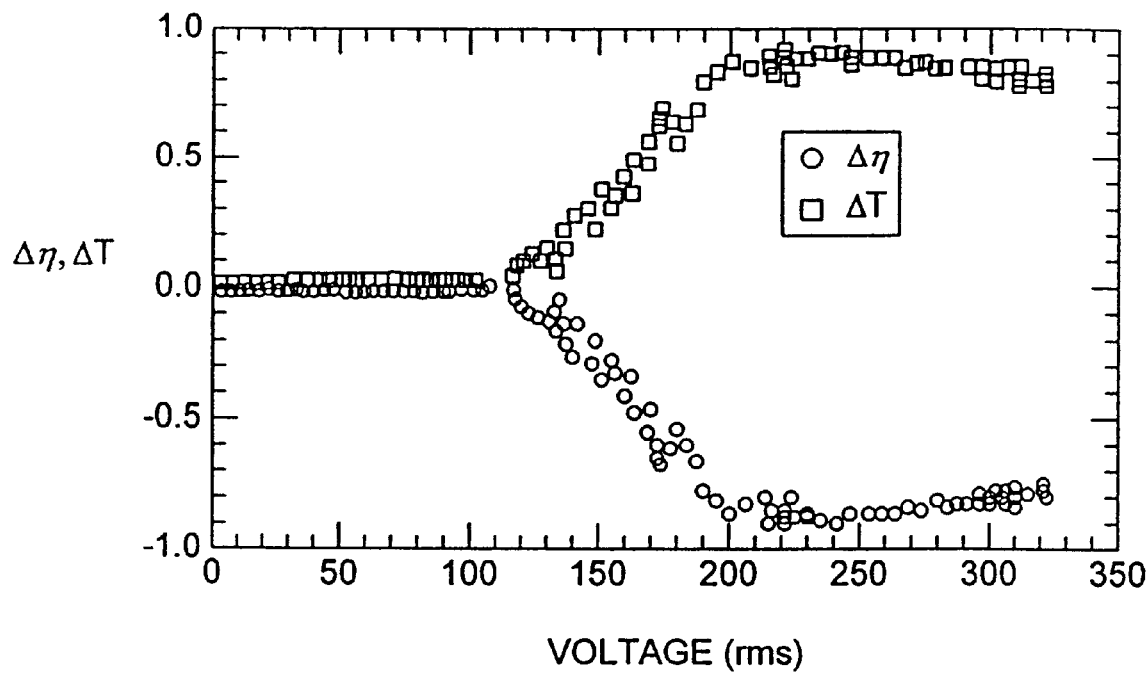
FIG. 2 is a graph of the normalized net transmittance and normalized net diffraction efficiency of a hologram (without the addition of a surfactant) versus the rms voltage applied across the hologram.

The scanning electron micrograph shown in FIG. 2 of the referenced *Applied Physics Letters* article and incorporated herein by reference is of the surface of a grating which was recorded in a sample with a 36 wt % loading of liquid crystal using the 488 nm line of an argon ion laser at an intensity of 95 mW/cm$^2$. The size of the liquid crystal domains is about 0.2 $\mu$m and the grating spacing is about 0.54 $\mu$m. This sample, which is approximately 20 $\mu$m thick, diffracts light in the Bragg regime.

FIG. 2 is a graph of the normalized net transmittance and normalized net diffraction efficiency of a hologram made according to the teachings of his disclosure versus the root mean square voltage ("Vrms") applied across the hologram. $\Delta\eta$ is the change in first order Bragg diffraction efficiency. $\Delta T$ is the change in zero order transmittance. FIG. 2 shows that energy is transferred from the first order beam to the zero-order beam as the voltage is increased. There is a true minimum of the diffraction efficiency at approximately 225 Vrms. The peak diffraction efficiency can approach 100%, depending on the wavelength and polarization of the probe beam, by appropriate adjustment of the sample thickness. The minimum diffraction efficiency can be made to approach 0% by slight adjustment of the parameters of the PDLC material to force the refractive index of the cured polymer to be equal to the ordinary refractive index of the liquid crystal.

Figure 3:
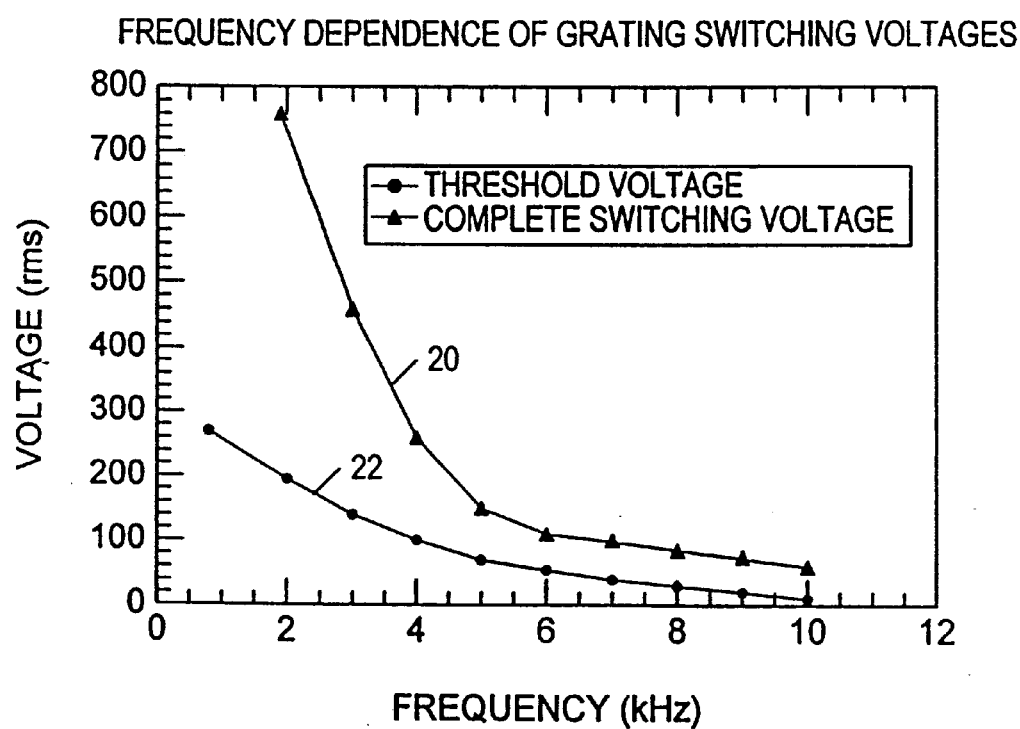
FIG. 3 is a graph of both the threshold and complete switching rms voltages needed for switching a hologram to minimum diffraction efficiency versus the frequency of the rms voltage.
Figure 4:
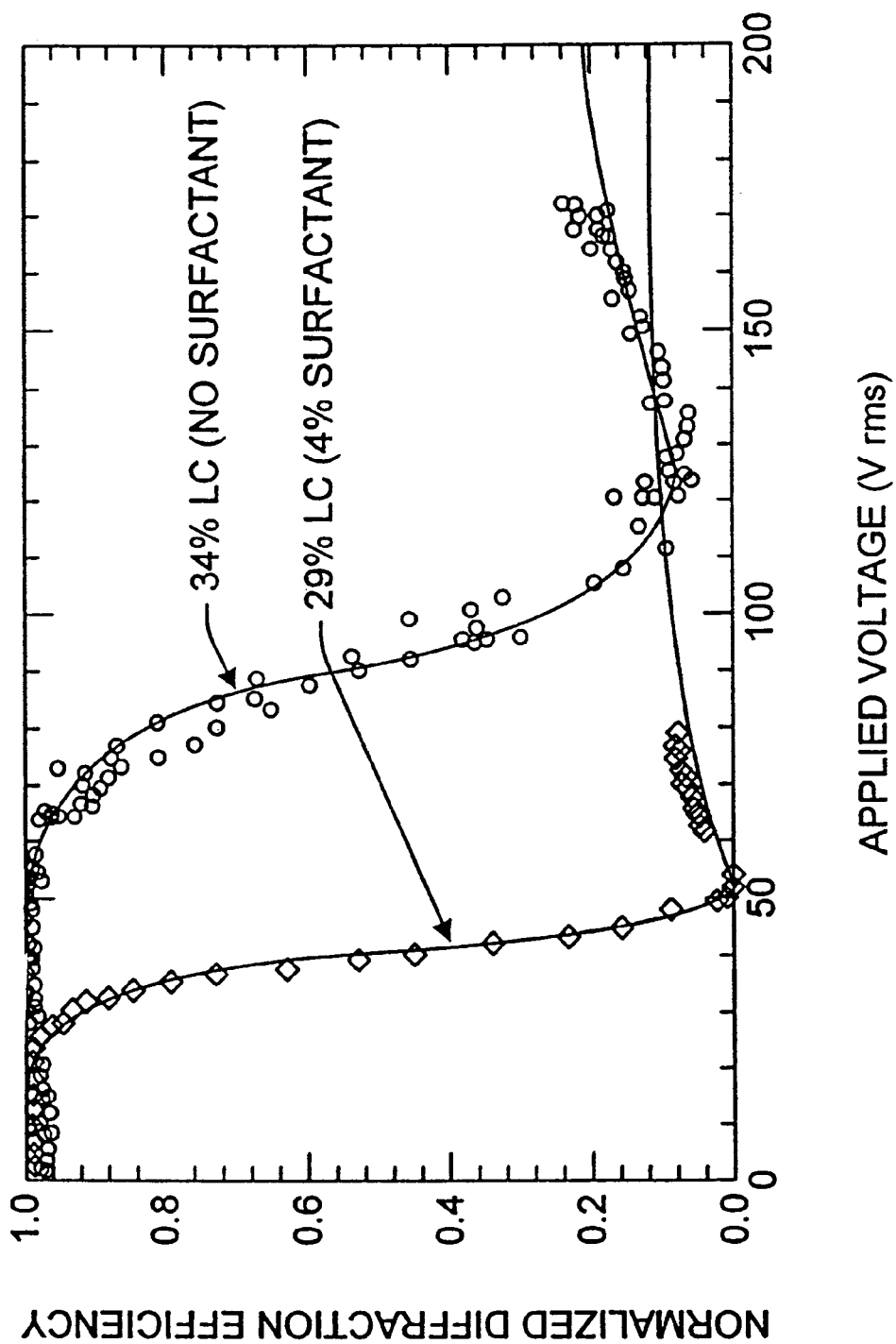
FIG. 4 is a graph of the normalized diffraction efficiency as a function of the applied electric field for a PDLC material formed with 34% by weight liquid crystal surfactant present and a PDLC material formed with 29% by weight liquid crystal and 4% by weight surfactant.

By increasing the frequency of the applied voltage, the switching voltage for minimum diffraction efficiency can be decreased significantly. This is illustrated in FIG. 3, which is a graph of both the threshold rms voltage 20 and the complete switching rms voltage 22 needed for switching a hologram made according to the teachings of this disclosure to minimum diffraction efficiency versus the frequency of the rms voltage. The threshold and complete switching rms voltages are reduced to 20 Vrms and 60 Vrms, respectively, at 10 kHz. Lower values are expected at even higher frequencies.

Figure 5:
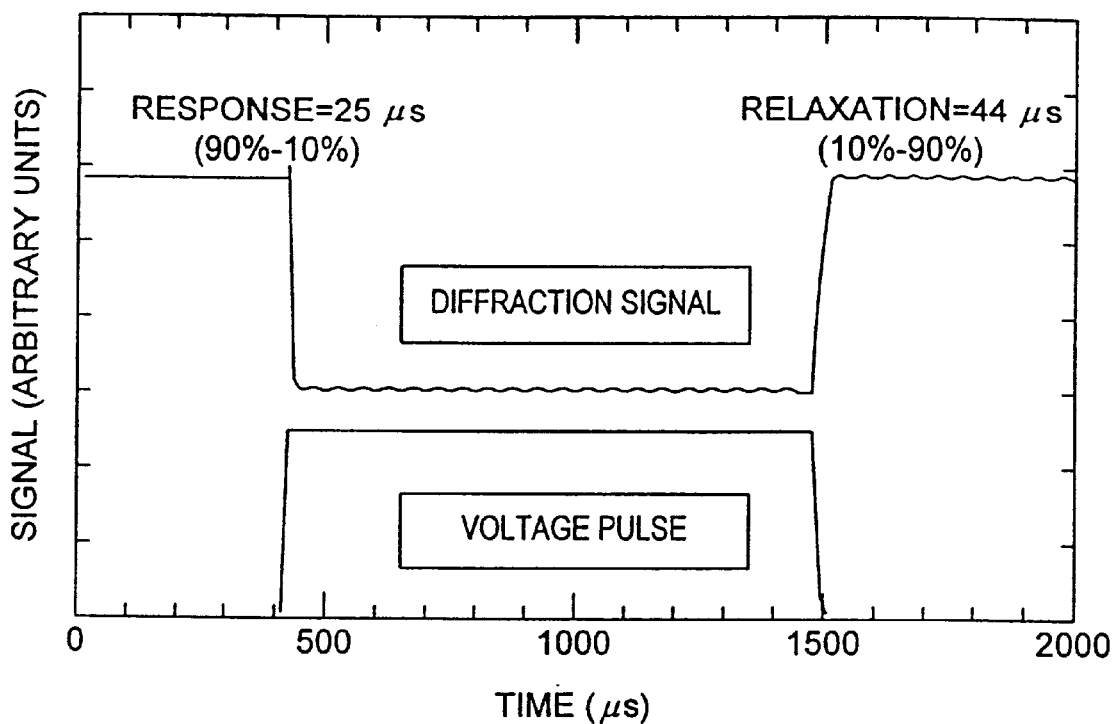
FIG. 5 is a graph showing the switching response time data for the diffracted beam in the surfactant-containing PDLC material in FIG. 4.
Figure 6:
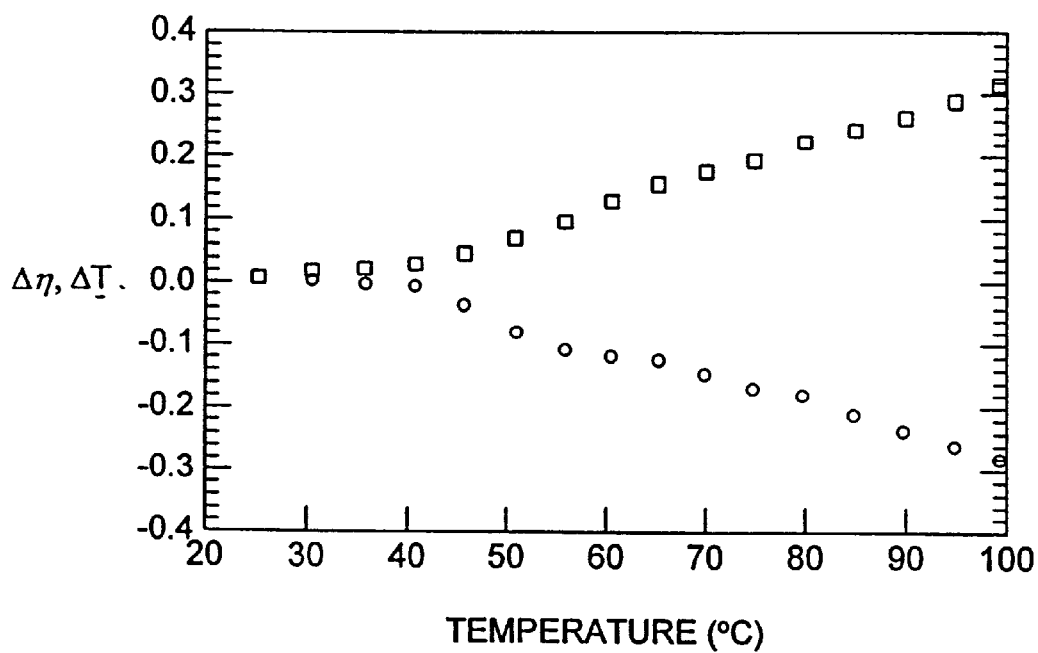
FIG. 6 is a graph of the normalized net transmittance and the normalized net diffraction efficiency of a hologram.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 4, it has been found that adding a surfactant (e.g., octanoic acid) the prepolymer material in amounts of about 4%–6% by weight of the total mixture results in sample holograms with switching voltages near 50 Vrms at lower frequencies of 1–2 kHz. As shown in FIG. 5, it has also been found that the use of the surfactant with the associated reduction in droplet size, reduces the switching time of the PDLC materials. Thus, samples made with surfactant can be switched on the order of 25–44 microseconds. Without wishing to be bound by any theory, the surfactant is believed to reduce switching voltages by reducing the anchoring of the liquid crystals at the interface between liquid crystal and cured polymer.

Thermal control of diffraction efficiency is illustrated in FIG. 5. FIG. 5 is a graph of the normalized net transmittance and normalized net diffraction efficiency of a hologram made according to the teachings of this disclosure versus temperature.

The polymer dispersed liquid crystal materials described herein successfully demonstrate the utility for recording volume holograms of a particular composition for such polymer dispersed liquid crystal systems.

Figure 7:
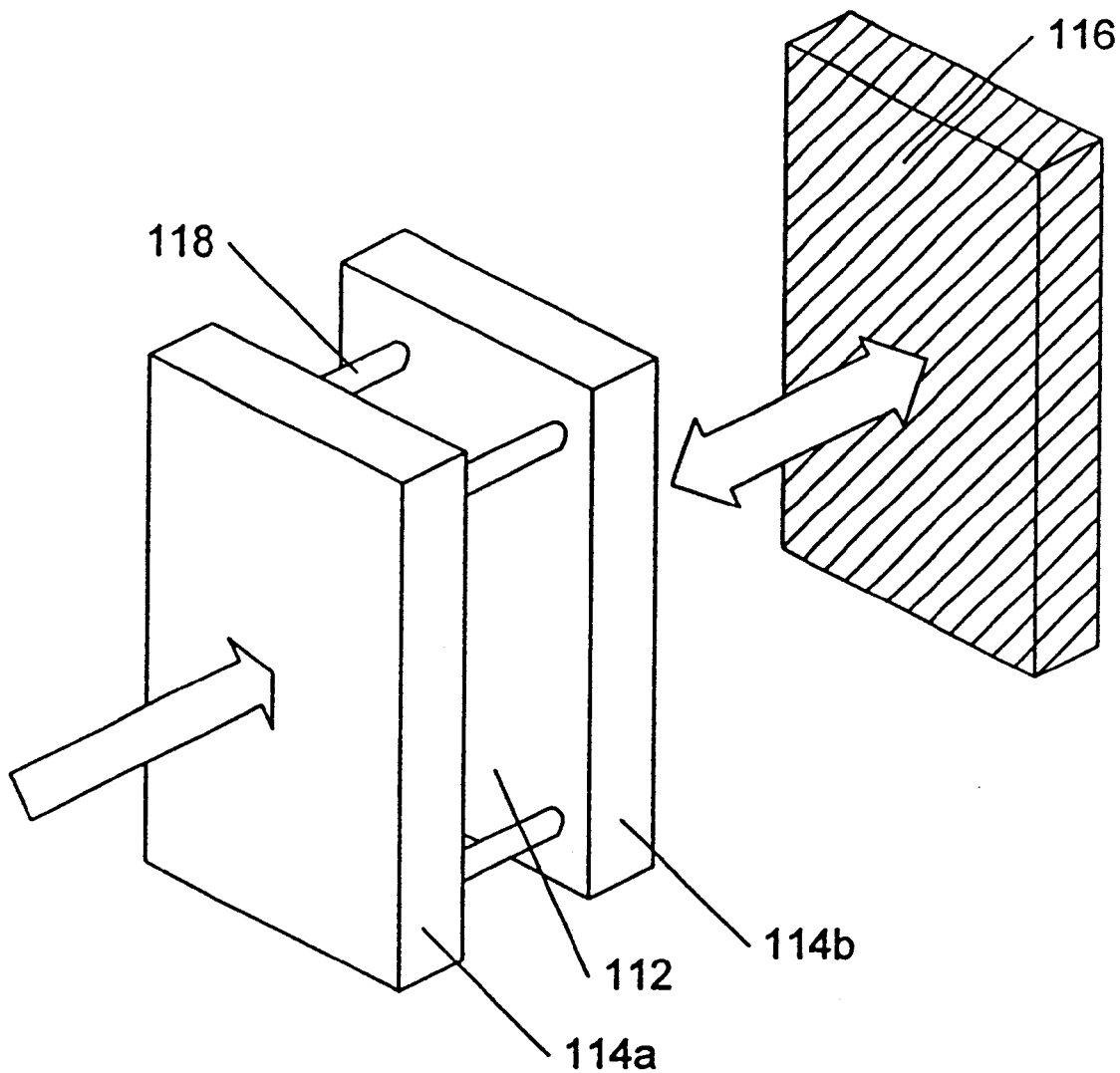
FIG. 7 is an elevational view of typical experimental arrangement for recording reflection gratings.

As shown in FIG. 7, a PDLC reflection grating is prepared by placing several drops of the mixture of prepolymer material 112 on an indium-tin oxide coated glass slide 114$a$. A second indium-tin oxide coated slide 114$b$ is then pressed against the first, thereby causing the prepolymer material 112 to fill the region between the slides 114$a$ and 114$b$. Preferably, the separation of the slides is maintained at approximately 20 $\mu$m by utilizing uniform spacers 118. Preparation, mixing and transfer of the prepolymer material is preferably done in the dark. Once assembled, a mirror 116 may be placed directly behind the glass plate 114$b$. The distance of the mirror from the sample is preferably substantially shorter than the coherence length of the laser. The PDLC material is preferably exposed to the 488 nm line of an argon-ion laser, expanded to fill the entire plane of the glass plate, with an intensity of approximately 0.1–100 mWatts/cm$^2$ with typical exposure times of 30–120 seconds. Constructive and destructive interference within the expanded beam establishes a periodic intensity profile through the thickness of the film.

In one embodiment, the prepolymer material utilized to make a reflection grating comprises a monomer, a liquid crystal, a cross-linking monomer, a coinitiator, and a photoinitiator dye. The reflection grating may be formed from prepolymer material comprising by total weight of the monomer dipentaerythritol hydroxypentacrylate (DPHA), 35% by total weight of a liquid crystal comprising a mixture of cyano biphenyls (known commercially as "E7"), 10% by total weight of a cross-linking monomer comprising N-vinylpyrrolidinone ("NVP"), 2.5% by weight of the coinitiator N-phenylglycine ("NPG"), and $10^{-5}$ to $10^{-6}$ gram moles of a photoinitiator dye comprising rose bengal ester. Further, as with transmission gratings, the addition of surfactants is expected to facilitate the same advantageous properties discussed above in connection with transmission gratings. It is also expected that similar ranges and variation of prepolymer starting material will find ready application in the formation of suitable reflection gratings.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 8a, grating 130 includes periodic planes of polymer channels 130a and PDLC channels 130b which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Further more, the droplets that were present in the material were significantly smaller having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity versus low intensity regions is much smaller. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in the one embodiment described above, it is believed that suitable PDLC materials could be prepared utilizing monomers such as triethyleneglycol diacrylate, trimethylolpropanetriacrylate, pentaerythritol triacrylate, pentaerythritol tetracrylate, pentaerythritol pentacrylate, and the like. Similarly, other coinitiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an argon ion laser, that the photoinitiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals such as 4'-pentyl-4-cyanobiphenyl or 4'-heptyl-4-cyanobiphenyl, can be utilized.

Figure 8A:
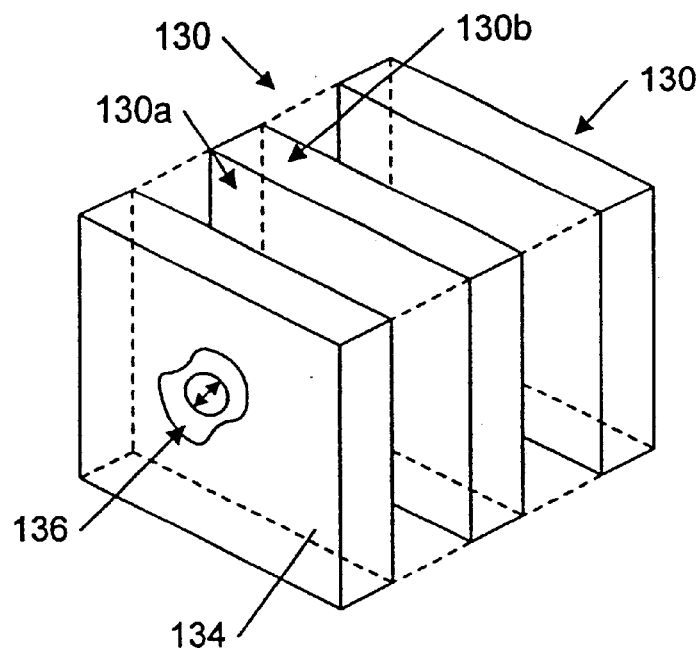
FIG. 8a and FIG. 8b are elevational views of a reflection grating having periodic planes of polymer channels and PDLC channels disposed parallel to the front surface in the absence of a field (FIG. 8a) and with an electric field applied (FIG. 8b) wherein the liquid-crystal utilized in the formation of the grating has a positive dielectric anisotropy.
Figure 8B:
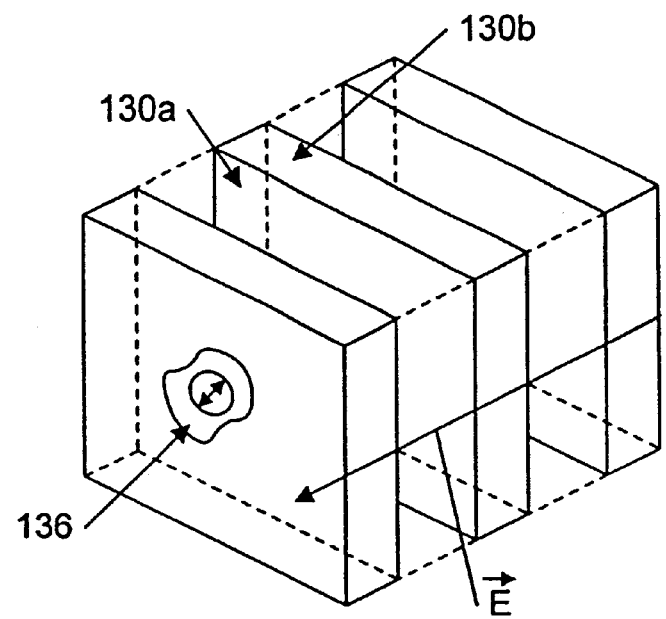

Referring again to FIG. 8a, there is shown an elevational view of a reflection grating 130 made in accordance with this disclosure having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 8b, the symmetry axis 136 is already in a low energy state in alignment with the field E and will reorient. Thus, reflection gratings formed in accordance with the procedure described above will not normally be switchable.

In general, a reflection grating tends to reflect a narrow wavelength band, such that the grating can be used as a reflection filter. In one embodiment, however, the reflection grating is formed so that it will be switchable. More particularly, switchable reflection gratings can be made utilizing negative dielectric anisotropy LCs (or LCs with a low cross-over frequency), an applied magnetic field, an applied shear stress field, or slanted gratings.

Figure 9A:
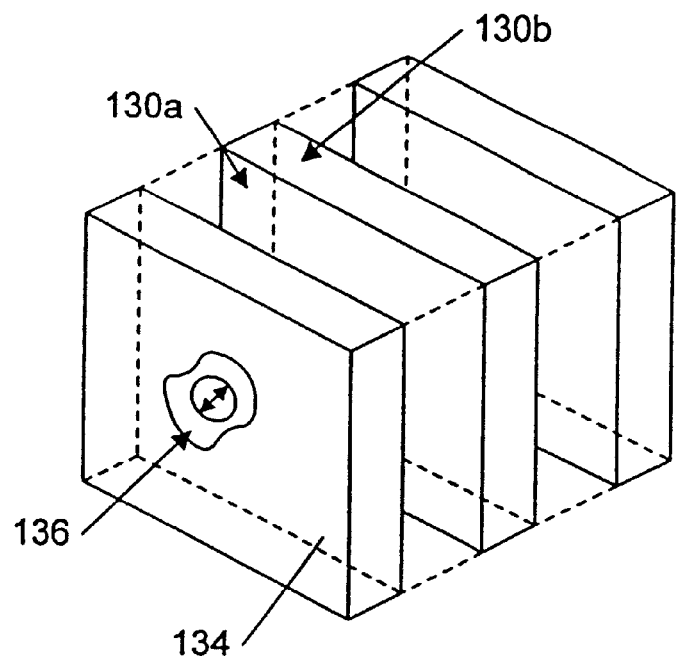
FIG. 9a and FIG. 9b are elevational views of a reflection grating having periodic planes of polymer channels and PDLC channels disposed parallel to the front surface of the grating in the absence of an electric field (FIG. 9a) and with an electric field applied (FIG. 9b) wherein the liquid crystal utilized in the formation of the grating has a negative dielectric anisotropy.
Figure 9B:
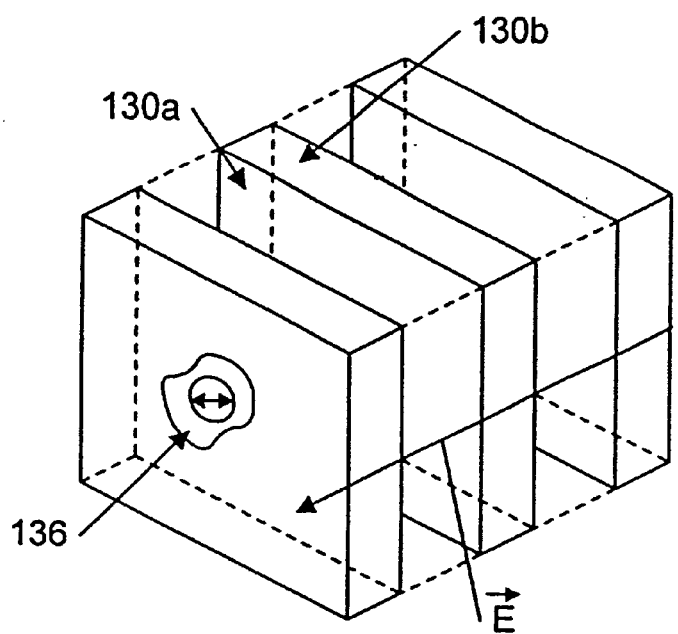

It is known that liquid crystals having a negative dielectric anisotropy ($\Delta\in$) will rotate in a direction perpendicular to an applied field. As shown in FIG. 9a, the axis 136 of the liquid crystal domains formed with a liquid crystal having a negative $\Delta\in$ will also be disposed in a direction perpendicular to the periodic channels 130a and 130b of the grating 130 and to the front surface 135 of the grating. However, when an electric field E is applied across such gratings, as shown in FIG. 9b, the symmetry axis of the negative $\Delta\in$ liquid crystal will distort and reorient in a direction perpendicular to the field E, which is perpendicular to the film and the periodic planes of the grating. As a result, the reflection grating can be switched between a state where it is reflective and a state where it is transmissive. The following negative $\Delta\in$ liquid crystals and others are expected to find ready applications in the methods and devises of the present invention:

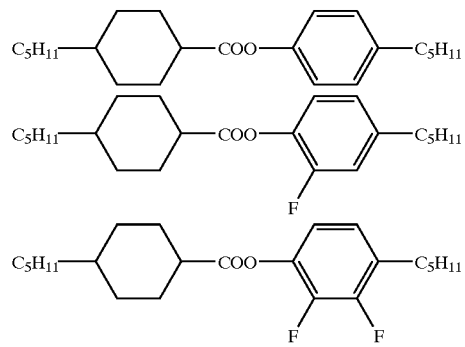

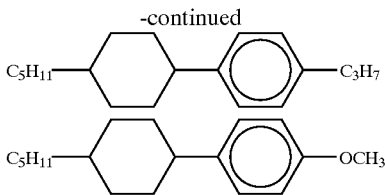

Liquid crystals can be found in nature (or synthesized) with either positive or negative $\Delta\in$. Thus, it is possible to use a LC which has a positive $\Delta\in$ at low frequencies, but becomes negative at high frequencies. The frequency (of the applied voltage) at which $\Delta\in$ changes sign is called the cross-over frequency. The cross-over frequency will vary with LC composition, and typical values range from 1–10 kHz. Thus, by operating at the proper frequency, the reflection grating may be switched. It is expected that low crossover frequency materials can be prepared from a combination of positive and negative dielectric anisotropy liquid crystals. A suitable positive dielectric liquid crystal for use in such a combination contains four ring esters as shown below:

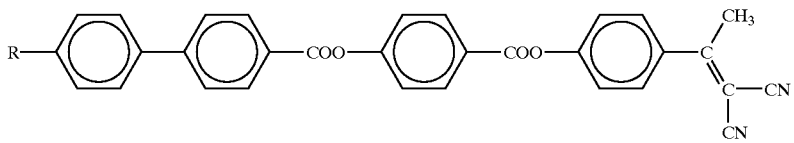

A strongly negative dielectric liquid crystal suitable for use in such a combination is made up of pyridazines as shown below:

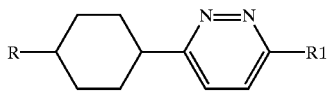

Both liquid crystal materials are available from LaRoche & Co., Switzerland. By varying the proportion of the positive and negative liquid crystals in the combination, crossover frequencies form 1.4–2.3 kHz are obtained at room temperature. Another combination suitable for use in the present embodiment is a combination of the following: p-pentylphenyl-2-chloro-4-(p-pentylbenzoyloxy)benzoate and benzoate. These materials are available from Kodak Company.

Figure 10A:
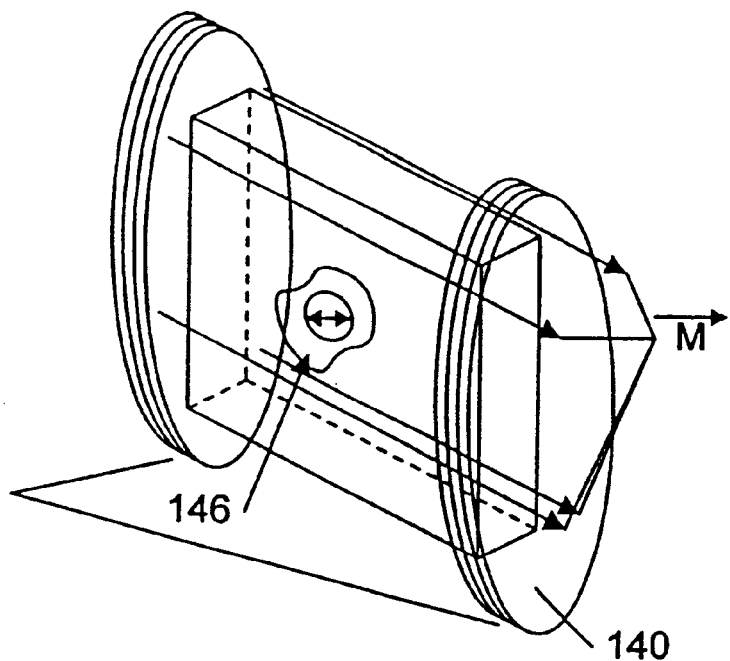
FIG. 10a is an elevational view of a reflection grating disposed within a magnetic field generated by Helmholtz coils.
Figure 10B:
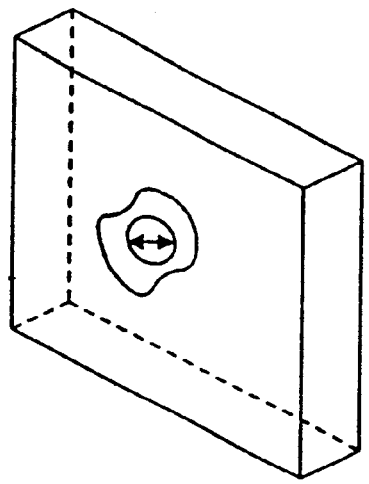
FIG. 10b and FIG. 10c are elevational views of the reflection grating of FIG. 10a in the absence of an electric field (FIG. 10b) and with an electric field applied (FIG. 10c)
Figure 10C:
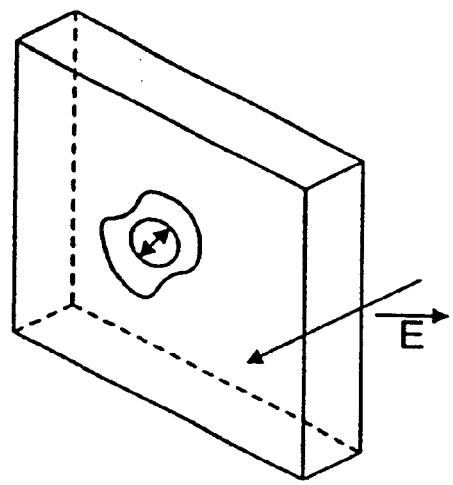

In still more detailed aspects, switchable reflection gratings can be formed using positive $\Delta\in$ liquid crystals. As shown in FIG. 10a, such gratings are formed by exposing the PDLC starting material to a magnetic field during the curing process. The magnetic field can be generated by the use of Helmholtz coils (as shown in FIG. 10a), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 10b.) When an electric field is applied, as shown in FIG. 10c the positive $\Delta\in$ liquid crystal will reorient in the direction of the field, which is perpendicular to the front surface of grating and to the periodic channels of the grating.

Figure 11A:
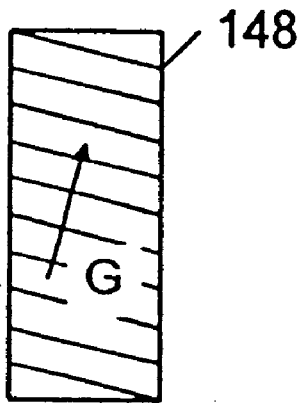
FIG. 11a and FIG. 11b are representative side views of a slanted transmission grating (FIG. 11a) and a slanted reflection grating (FIG. 11b) showing the orientation of the grating vector G of the periodic planes of polymer channels and PDLC channels.
Figure 11B:
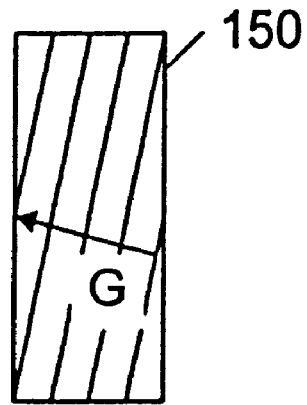

FIG. 11a depicts a slanted transmission grating 148 and FIG. 11b depicts a slanted reflection grating 150. A holographic transmission grating is considered slanted if the direction of the grating vector G is not parallel to the grating surface. In a holographic reflection grating, the grating is said to be slanted if the grating vector G is not perpendicular to the grating surface. Slanted gratings have many of the same uses as nonslanted grating such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangent and perpendicular to the grating vector. In particular, for the reflection grating, the LC domain symmetry axis will be oriented along the grating vector G and can be switched to a direction perpendicular to the film plane by a longitudinally applied field E. This is the typical geometry for switching of the diffraction efficiency of the slanted reflection grating.

When recording slanted reflection gratings, it is desirable to place the sample between the hypotenuses of two right-angle glass prisms. Neutral density filters can then be placed in optical contact with the back faces of the prisms using index matching fluids so as to frustrate back reflections which would cause spurious gratings to also be recorded. The incident laser beam is split by a conventional beam splitter into two beams which are then directed to the front faces of the prisms, and then overlapped in the sample at the desired angle. The beams thus enter the sample from opposite sides. This prism coupling technique permits the light to enter the sample at greater angles. The slant of the resulting grating is determined by the angle which the prism assembly is rotated (i.e., the angle between the direction of one incident beam an the normal to the prism front face at which that beam enters the prism).

Figure 12:
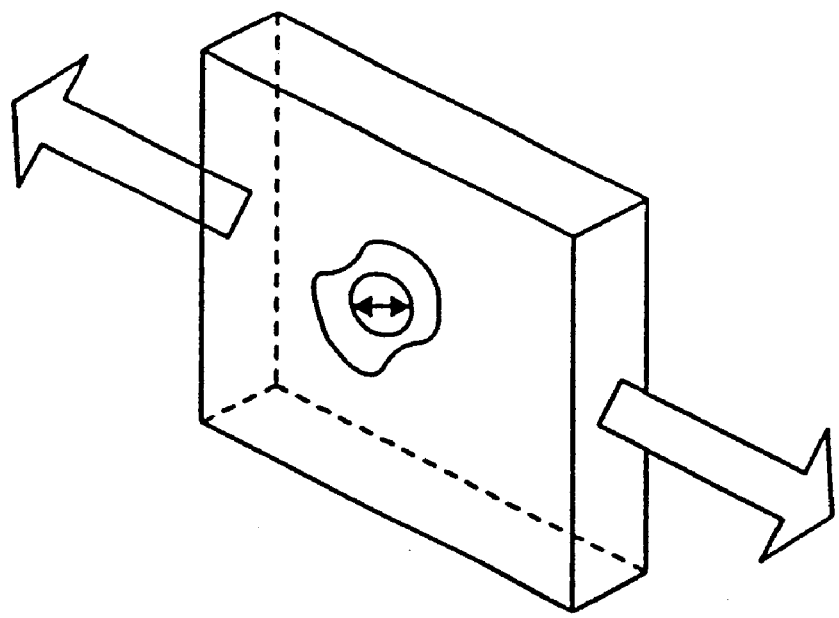
FIG. 12 is an elevational view of a reflection grating when a shear stress field is applied thereto.

As shown in FIG. 12, switchable reflection gratings may be formed in the presence of an applied shear stress field. In this method, a shear stress would be applied along the direction of a magnetic field M. This could be accomplished, for example, by applying equal and opposite tensions to the two ITO coated glass plates which sandwich the prepolymer mixture while the polymer is still soft. This shear stress would distort the LC domains in the direction of the stress, and the resultant LC domain symmetry axis will be preferentially along the direction of the stress, parallel to the PDLC planes and perpendicular to the direction of the applied electric field for switching.

Reflection grating prepared in accordance with this description may find application in color reflective displays, switchable wavelength filters for laser protection, reflective optical elements and the like.

Figure 13:
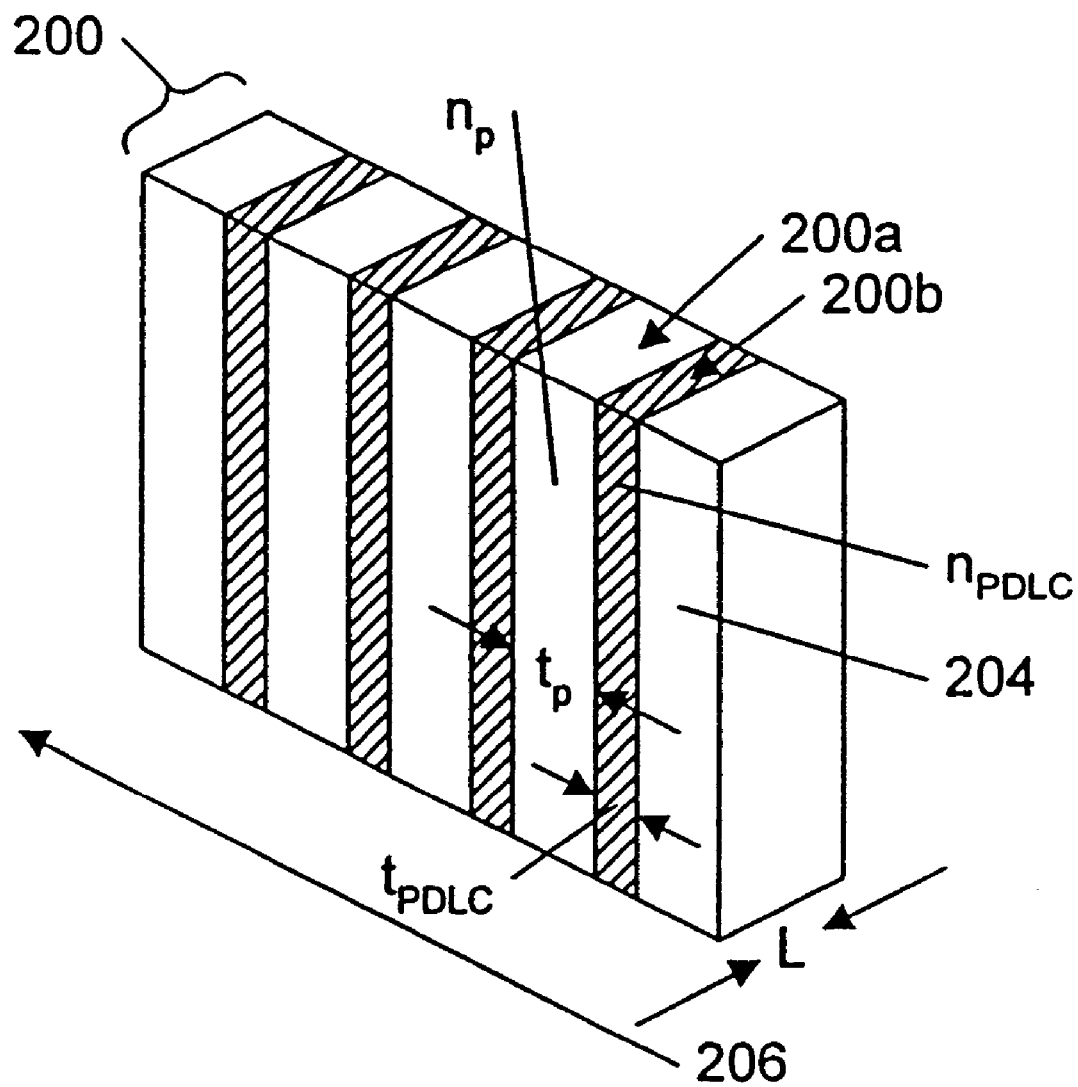
FIG. 13 is an elevational view of a subwavelength grating having periodic planes of polymer channels and PDLC channels disposed perpendicular to the front surface of the grating.

In one embodiment, PDLC materials can be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 13, there is shown an elevational view of a transmission grating 200 made in accordance with this description having periodic planes of polymer planes 200a and PDLC planes 200b disposed perpendicular to the front surface 204 of the grating 200. The optic axis 206 is disposed perpendicular to polymer planes 200a and the PDLC planes 200b. Each polymer plane 200a has a thickness $t_p$ and refractive index $n_p$, and each PDLC plane 200b has a thickness $t_{PDLC}$ and refractive index $n_{PDLC}$.

Where the combined thickness of the PDLC plane and the polymer plane is substantially less than an optical wavelength (i.e. $(t_{PDLC}+t_p)<<\lambda$), the grating will exhibit form birefringence. As discussed below, the magnitude of the shift in polarization is proportional to the length of the grating. Thus, by carefully selecting the length, L, of the subwavelength grating for a given wavelength of light, one can rotate the plane of polarization or create circularly polarized light. Consequently, such subwavelength gratings can be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e. retardance=$\lambda/2$, and to form a quarter-wave plate, the retardance must be equal to one-quarter of a wavelength, i.e. retardance=$\lambda/4$. It is known that the retardance is related to the net birefringence, $|\Delta n|$, which is the difference between the ordinary index of refraction, $n_o$, and the extraordinary index of refraction $n_e$, of the sub-wavelength grating by the following relation:

$$\text{Retardance}=|\Delta n|L=|n_e-n_o|L$$

Thus, for a half-wave plate, i.e. a retardation equal to one-half of a wavelength, the length of the subwavelength grating should be selected so that:

$$L=\lambda/(2|\Delta n|)$$

Similarly, for a quarter-wave plate, i.e. a retardance equal to one-quarter of a wavelength, the length of the subwavelength grating should be selected so that:

$$L=\lambda/(4|\Delta n|)$$

Figure 14A:
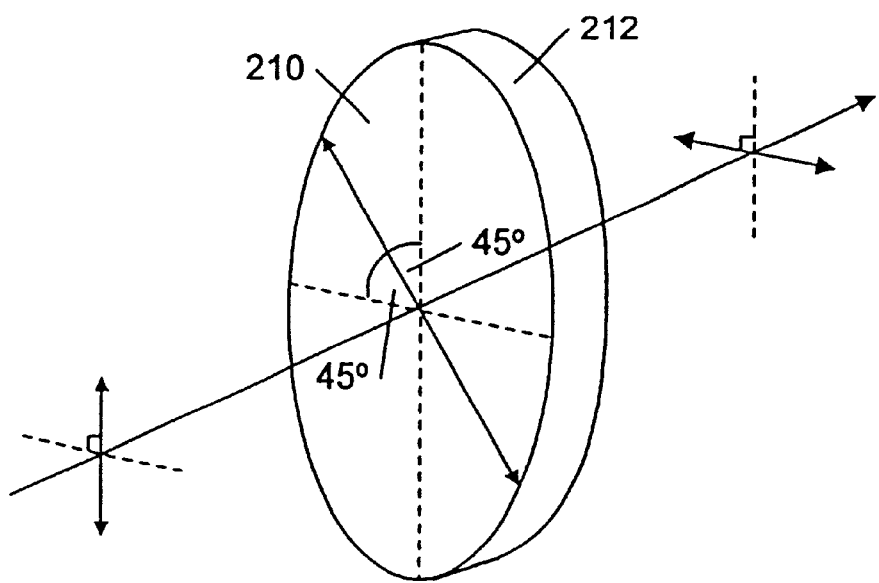
FIG. 14a is an elevational view of a switchable subwavelength wherein the subwavelength grating functions as a half wave plate whereby the polarization of the incident radiation is rotated by 90°.
Figure 14B:
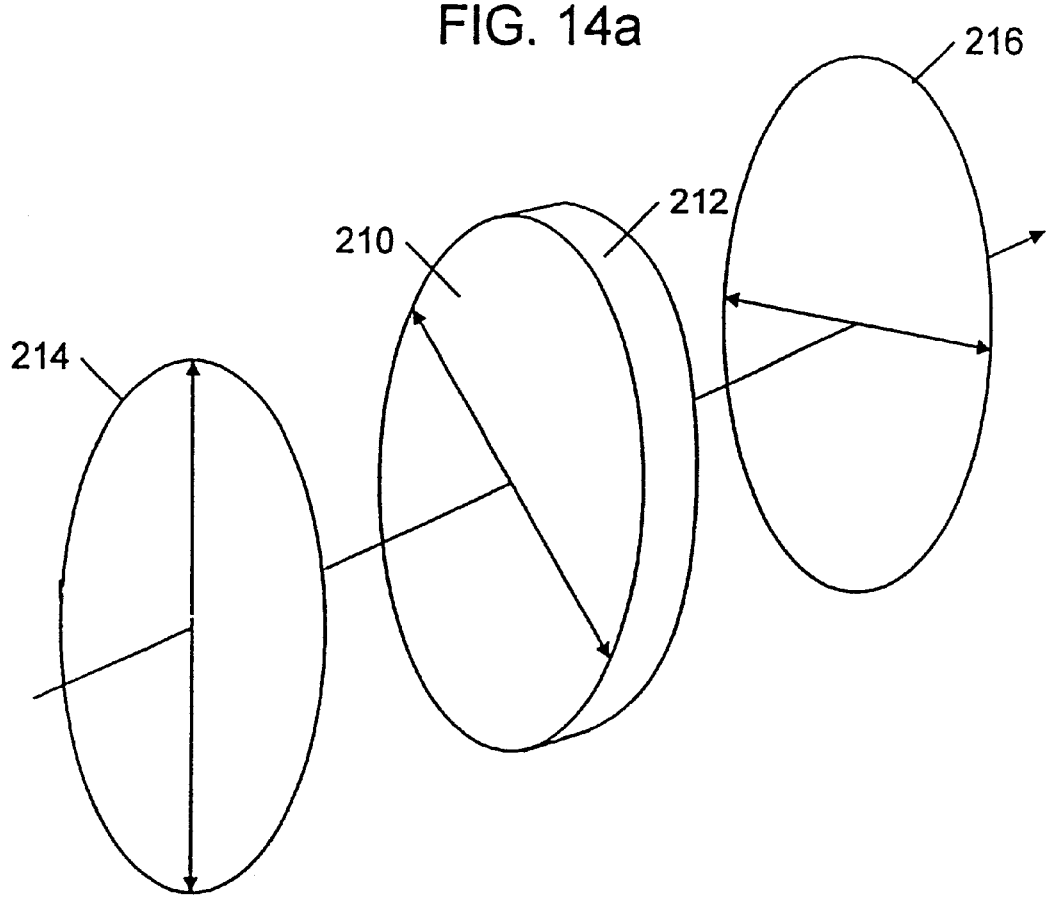
FIG. 14b is an elevational view of the switchable half wave plate shown in FIG. 14a disposed between crossed polarizers whereby the incident light is transmitted.
Figure 14C:
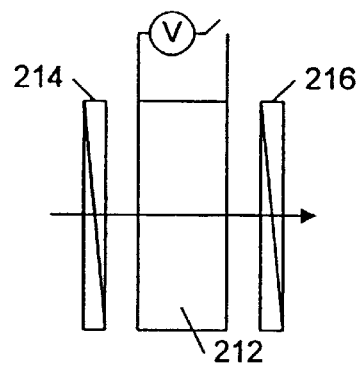
FIG. 14c and FIG. 14d are side views of the switchable half wave plate and crossed polarizes shown in FIG. 14b and showing the effect of the application of a voltage to the plate whereby the polarization of the light is no longer rotated and thus blocked by the second polarizer.
Figure 14D:
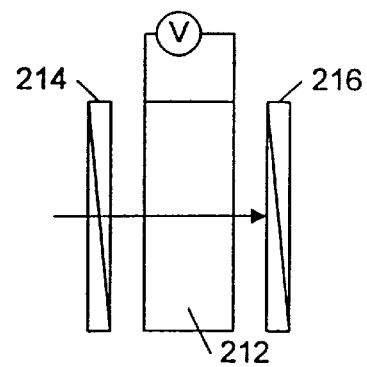

If, for example, the polarization of the incident light is at an angle of 45° with respect to the optic axis 210 of a half-wave plate 212, as shown in FIG. 14a, the plane polarization will be preserved, but the polarization of the wave exiting the plate will be shifted by 90°. Thus, referring now to FIGS. 14b and 14c, where the half-wave plate 212 is placed between cross polarizers 214 and 216, the incident light will be transmitted. If an appropriate switching voltage is applied, as shown in FIG. 14d, the polarization of the light is not rotated and the light will be blocked by the second polarizer.

Figure 15A:
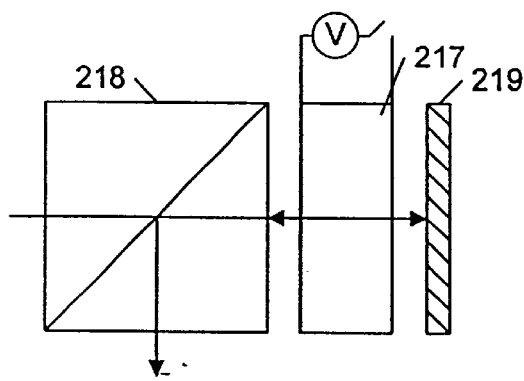
FIG. 15a is a side view of a switchable subwavelength rating wherein the subwavelength grating functions as a quarter wave plate whereby plane polarized light is transmitted through the subwavelength grating, retroreflected by a mirror and reflected by the beam splitter.
Figure 15B:
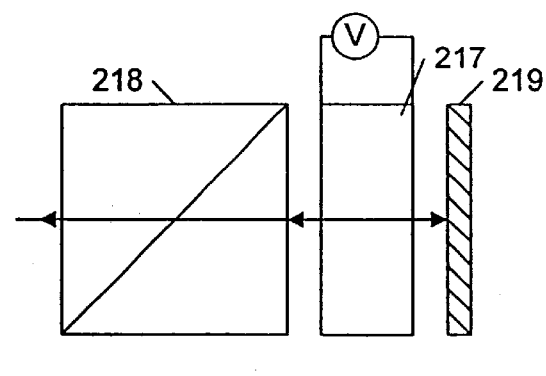
FIG. 15b is a side view of the switchable subwavelength grating of FIG. 15a and showing the effect of the application of a voltage to the plate whereby the polarization of the light is no longer modified, thereby permitting the reflected light to pass through he beam splitter.

For a quarter wave plate plane polarized light is converted to circularly polarized light. Thus, referring now to FIG. 15a, where quarter wave plate 217 is placed between a polarizing beam splitter 218 and a mirror 219, the reflected light will be reflected by the beam splitter 218. If an appropriate switching voltage is applied, as shown in FIG. 15b, the reflected light will pass through the beam splitter and be retroreflected on the incident beam.

Figure 16A:
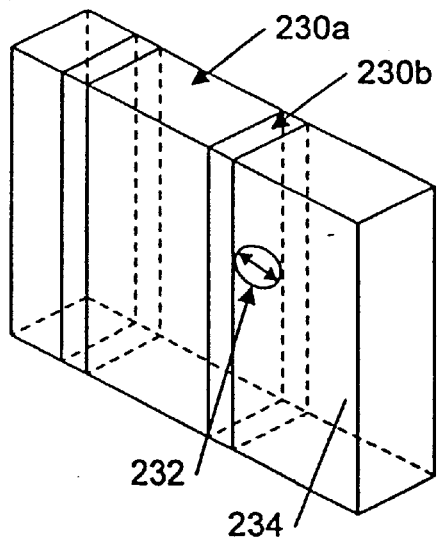
FIG. 16a and FIG. 16b are elevational views of a transmission grating having periodic planes of polymer channels and PDLC channels disposed perpendicular to the front face of the grating in the absence of an electric field (FIG. 16a) and with an electric field applied (FIG. 16b) wherein the liquid crystal utilized in formation of the grating has a positive dielectric anisotropy.
Figure 16B:
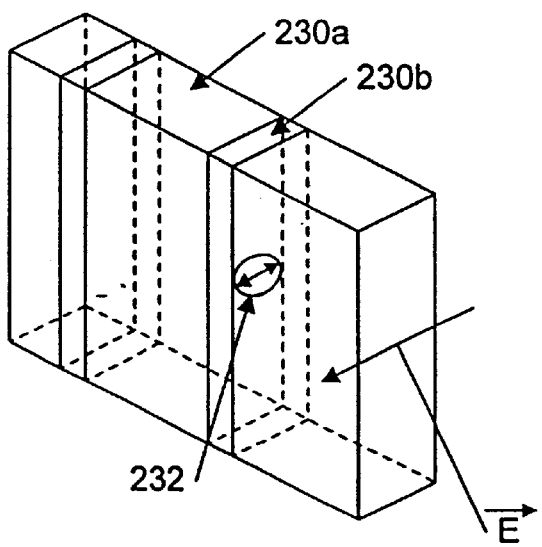

Referring now to FIG. 16a, there is shown an elevational view of a subwavelength grating 230 recorded in accordance with the above-described methods and having periodic planes of polymer channels 230a and PDLC channels 230b disposed perpendicular to the front surface 234 of grating 230. As shown in FIG. 16a, the symmetry axis 232 of the liquid crystal domains is disposed in a direction parallel to the front surface 234 of the grating and perpendicular to the periodic channels 230a and 230b of the grating 230. Thus, when an electric field E is applied across the grating, as shown in FIG. 15b, the symmetry axis 232 distorts and reorients in a direction along the field E, which is perpendicular to the front surface 234 of the grating and parallel to the periodic channels 230a and 230b of the grating 230. As a result, subwavelength grating 230 can be switched between a state where it changes the polarization of the incident radiation and a state in which it does not. Without wishing to be bound by any theory, it is currently believed that the direction of the liquid crystal domain symmetry 232 is due to a surface tension gradient which occurs as a result of the anisotropic diffusion of monomer and liquid crystal during recording of the grating and that this gradient causes the liquid crystal domain symmetry to orient in a direction perpendicular to the periodic planes.

As discussed in Born and Wolf, Principles of Optics, 5$^{th}$ Ed., New York (1975), incorporated herein by reference, the birefringence of a subwavelength grating is given by the following relation:

$$n_e^2-n_o^2=-[(f_{PDLC})(f_p)(n_{PDLC}^2-n_p^2)]/[f_{PDLC}n_{PDLC}^2+f_p n_p^2]$$

Where:

$n_o$=the ordinary index of refraction of the subwavelength grating;

$n_e$=the extraordinary index of refraction;

$n_{PDLC}$=the refractive index of the PDLC plane;

$n_p$=the refractive index of the polymer plane $n_{LC}$=the effective refractive index of the liquid crystal seen by an incident optical wave;

$f_{PDLC}=t_{PDLC}/(t_{PDLC}+t_p)$ $f_P=t_P/(t_{PDLC}+t_P)$

Thus, the net birefringence of the subwavelength grating will be zero if $n_{PDLC}=n_p$.

It is known that the effective refractive index of the liquid crystal, $n_{LC}$, is a function of the applied electric field, having a maximum when the field is zero and value equal to that of the polymer, $n_p$, at some value of the electric field, $E_{MAX}$. Thus, by application of an electric field, the refractive index of the liquid crystal, $n_{LC}$, and, hence, the refractive index of the PDLC plane can be altered. Using the relationship set forth above, the net birefringence of a subwavelength grating will be a minimum when $n_{PDLC}$ is equal to $n_P$, i.e. when $n_{LC}=n_P$. Therefore, if the refractive index of the PDLC plane can be matched to the refractive index of the polymer plane, i.e. $n_{PDLC}=n_p$, by the application of an electric field, the birefringence of the subwavelength grating can be switched off.

The following equation for net birefringence, i.e. $|\Delta n|=|n_e-n_o|$, follows from the equation given in Born and Wolf (reproduced above):

$$\Delta n=-[(f_{PDLC})(f_p)(n_{PDLC}^2-n_p^2)]/[2n_{AVG}(f_{PDLC}n_{PDLC}^2+f_p n_p^2)]$$

where $n_{AVG}=(n_e+n_o)/2$.

Furthermore, it is known that the refractive index of the PDLC plane $n_{PDLC}$ is related to the effective refractive index of the liquid crystal seen by an incident optical wave, $n_{LC}$, and the refractive index of the surrounding polymer plane, $n_P$, by the following relation:

$$N_{PDLC} = n_P + f_{LC}[n_{LC} - n_P]$$

Where $f_{LC}$ is the volume fraction of liquid crystal dispersed in the polymer within the PDLC plane, $f_{LC} = [V_{LC}/(V_{LC} + V_P)]$.

By way of example, a typical value for the effective refractive index for the liquid crystal in the absence of an electric field is $n_{LC} = 1.7$, and for the polymer layer $n_P = 1.5$. For the grating where the thickness of the PDLC planes and the polymer planes are equal (i.e. $t_{PDLC} = t_P$, $f_{PDLC} = 0.5 = f_P$) and $f_{LC} = 0.35$, the net birefringence, $\Delta n$, of a the subwavelength grating is approximately 0.008. Thus, where the incident light has a wavelength of 0.8 $\mu$m, the length of the subwavelength grating should be 50 $\mu$m for a half-wave plate and a 25 $\mu$m for a quarter-wave plate. Furthermore, by application of an electric field of approximately 5 V/$\mu$m, the refractive index of the liquid crystal can be matched to the refractive index of the polymer and the birefringence of the subwavelength grating turned off. Thus, the switching voltage, $V_n$, for a half-wave plate is on the order of 250 volts, and for a quarter-wave plate approximately 125 volts.

By applying such voltages, the plates can be switched between the on and off (zero retardance) states on the order of microseconds. As a means of comparison, current Pockels cell technology can be switched in nanoseconds with voltages of approximately 1000–2000 volts, and bulk nematic liquid crystals can be switched on the order of milliseconds with voltages of approximately 5 volts.

Figure 17:
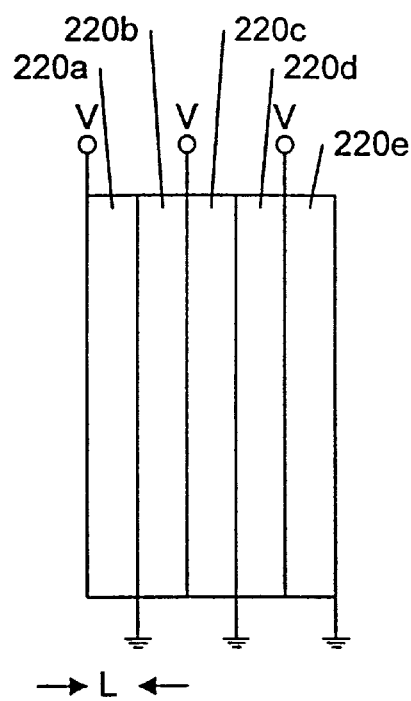
FIG. 17 is a side view of five subwavelength gratings wherein the gratings are stacked and connected electrically in parallel thereby reducing the switching voltage of the subwavelength grating.

In an alternative embodiment, as shown in FIG. 17, the switching voltage of the subwavelength grating can be reduced by stacking several subwavelength gratings 220a–220e together, and connecting them electrically in parallel. By way of example, it has been found that a stack of five gratings each with a length of 10 $\mu$m yields the thickness required for a half-wave plate. It should be noted that the length of the sample is somewhat greater than 50 $\mu$m, because each grating includes an indium-tin-oxide coating which acts as a transparent electrode. The switching voltage for such a stack of plates, however, is only 50 volts.

Subwavelength gratings in accordance with the this description are expected to find suitable application in the areas of polarization optics and optical switches for displays and laser optics, as well as tunable filters for telecommunications, colorimetry, spectroscopy, laser protection, and the like. Similarly, electrically switchable transmission gratings have many applications for which beams of light must be deflected or holographic images switched. Among these applications are: Fiber optic switches, reprogrammable NxN optical interconnects for optical computing, beam steering for laser surgery, beam steering for laser radar, holographic image storage and retrieval, digital zoom optics (switchable holographic lenses), graphic arts and entertainment, and the like.

In a preferred embodiment, a switchable hologram is one for which the diffraction efficiency of the hologram may be modulated by the application of an electric field, and can be switched from a fully on state (high diffraction efficiency) to a fully off state (low or zero diffraction efficiency). A static hologram is one whose properties remain fixed independent of an applied field. In accordance with this description, a high contrast status hologram can also be created. In this variation of this description, the holograms are recorded as described previously. The cured polymer film is then soaked in a suitable solvent at room temperature for a short duration and finally dried. For the liquid crystal E7, methanol has shown satisfactory application. Other potential solvents include alcohols such as ethanol, hydrocarbons such as hexane and heptane, and the like. When the material is dried, a high contrast status hologram with high diffraction efficiency results. The high diffraction efficiency is a consequence of the large index modulation in the film ($\Delta n$~0.5) because the second phase domains are replaced with empty (air) voids (n~1).

Similarly, in accordance with this description a high birefringence static subwavelength wave-plate can also be formed. Due to the fact that the refractive index for air is significantly lower than for most liquid crystals, the corresponding thickness of the half-wave plate would be reduced accordingly. Synthesized wave-plates in accordance with this description can be used in many applications employing polarization optics, particularly where a material of the appropriate birefringence at the appropriate wavelength is unavailable, too costly, or too bulky.

The term polymer dispersed liquid crystals and polymer dispersed liquid crystal material includes, as may be appropriate, solutions in which none of the monomers have yet polymerized or cured, solutions in which some polymerization has occurred, and solutions which have undergone complete polymerization. Those of skill in the art will clearly understand that the use herein of the standard term used in the art, polymer dispersed liquid crystals (which grammatically refers to liquid crystals dispersed in a fully polymerized matrix) is meant to include all or part of a more grammatically correct prepolymer dispersed liquid crystal material or a more grammatically correct starting material for a polymer dispersed liquid crystal material.

Figure 18:
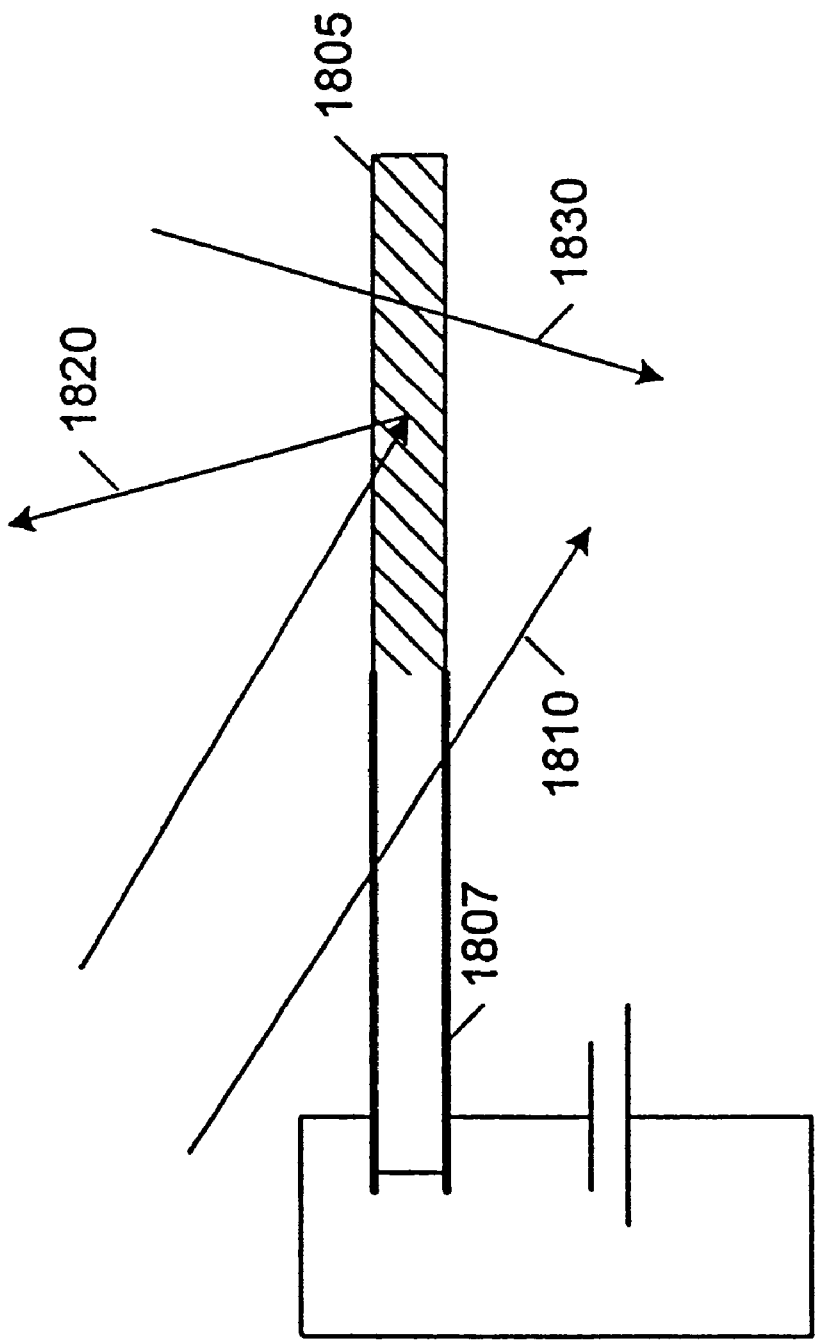
FIG. 18 shows a switchable holographic optical element that can be selectively made transparent.

FIG. 18: Switchable Holographic Optical Element

FIG. 18 shows one embodiment of a switchable holographic optical element (HOE) in operation. In this diagram, an electric field is applied across a part of switchable HOE 1805 through electrode plates 1807. The electric field renders the HOE transparent by effectively erasing the grating structure from the HOE. The portion of switchable HOE 1805 not exposed to the electric field from electrodes 1807 still functions as a hologram since its grating structure, indicated by the hash marks in the figure, is intact. A ray of light 1820 of the appropriate color and at an appropriate incidence angle is diffracted by this portion of HOE 1805. A ray of light 1810 that is incident upon the portion of switchable HOE 1805 between electrodes 1807, however, is transmitted through HOE 1805. Also, light such as ray 1830 is transmitted through the diffractive portion of HOE 1805 if it is either out of the bandwidth of switchable HOE 1805 or incident with an angle that is not sufficiently close to the diffraction angle of switchable HOE 1805 in the region where the ray intersects the HOE. It can be seen that with the use of many electrode plates such as 1807, many different portions of switchable HOE 1805 may be rendered diffractive, partially diffractive, or transparent by applying the appropriate electric field to the relevant portions of switchable HOE 1805. By adjusting the applied electric field, the intensity of the diffracted light may be controlled over a dynamic range. More particularly, when the applied electric field is changed, the diffraction efficiency changes correspondingly. As the field increases, the refractive index modulation is reduced and hence the diffraction efficiency is also reduced with the result that less light is transferred from the zero order direction (i.e., the input beam direction) into the diffracted beam direction. When the electric field is reduced the refractive index modulation increases, resulting in more light being transferred from the zero order direction in the diffracted beam direction. In one embodiment, the HOE is a thin-grating hologram. In another embodiment, switchable HOE 1805 is a Bragg-type or volume hologram with high diffraction efficiency.

One embodiment of this system uses a switchable HOE 1805 composed of photo-polymer/liquid-crystal composite materials onto which holograms characterized by high diffraction efficiency and fast switching rates can be recorded. Switchable HOE 1805 is sandwiched between transparent electrodes, and can be switched from a diffracting state to a passive state by adjusting an electric field applied by the electrodes.

Switchable HOE 1805 may include an exposed PDLC material such as for example, the material presented in FIG. 1. The PDLC material undergoes phase separation during the exposure process (i.e., during the hologram recording process), creating regions densely populated by liquid crystal droplets, interspersed by regions of clear photopolymer. In the substantially transparent state, an electric field is applied to the exposed PDLC and changes the natural orientation of the liquid crystal droplets therein which, in turn, causes the refractive index modulation of the fringes to reduce and the hologram diffraction efficiency to drop to very low levels, effectively erasing the hologram recorded therein. No electric field is applied in the diffracting state, in which the exposed PDLC material exhibits its very high diffraction efficiency. The exposed PDLC switches between the diffracting state and the substantially transparent state very quickly (e.g., the exposed material can be switched in tens of microseconds, which is very fast when compared with conventional liquid crystal display materials).

Figure 19:
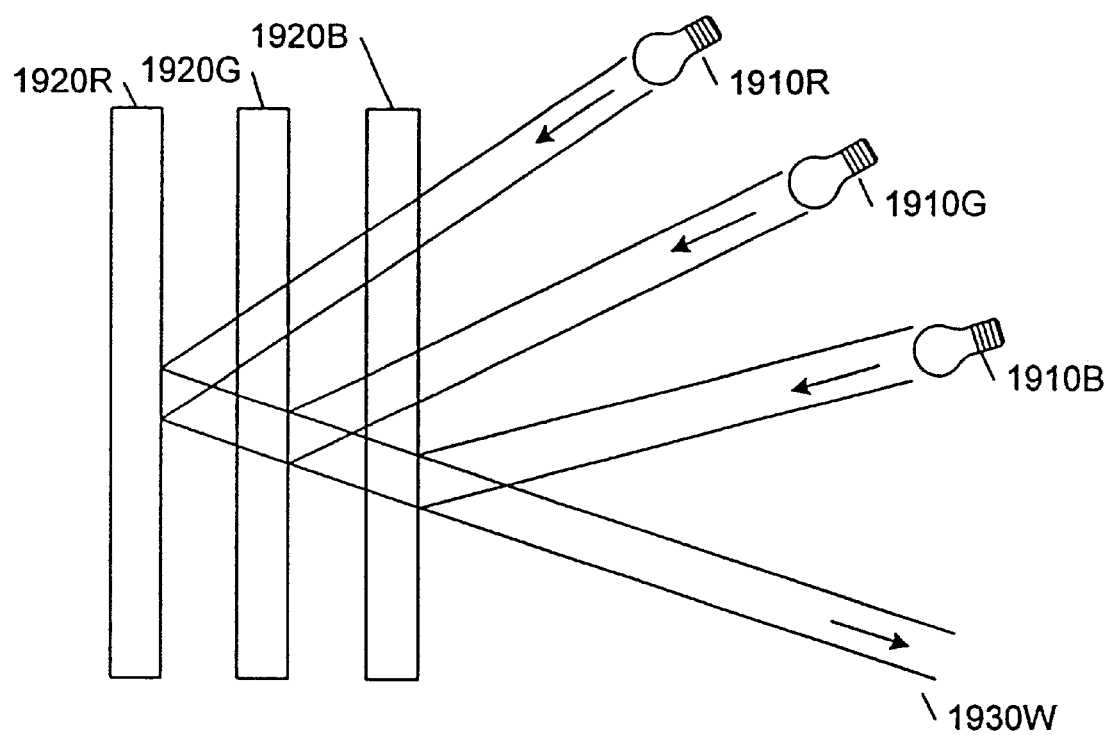
FIG. 19 shows one embodiment of a system using a stack of holographic optical elements to combine light of different colors.

FIGS. 19–20: Combining Optical Sources with Holographic Optical Elements

FIG. 19 shows one embodiment of a system for combining optical sources of different colors to generate polychromatic light. In this system, three sources of light with different colors, red 1910R, green 1910G, and blue 1910B, are incident upon an HOE stack comprising three HOEs 1920R, 1920G, and 1920B. Each of these HOEs is constructed to diffract light of one color. HOE 1920R diffracts red light, HOE 1920G diffracts green light, and 1920B diffracts blue light. Light from each of the three sources is diffracted by the corresponding one of the three HOEs into a common output direction, and is substantially transmitted through the HOEs that do not have the corresponding color sensitivity. HOEs 1920R, 1920G, and 1920B are aligned so that the light diffracted from each of them is substantially overlapping. This output light travels as a beam of mixed light 1930W. In a preferred embodiment, the relative intensities of the three light sources and the diffraction efficiencies of the three HOEs are matched so that the output light 1930W is a substantially "white" light.

In one embodiment of the system, HOEs 1920R, 1920G, and 1920B are not switchable holograms. These HOEs have fixed diffractive structures with predetermined diffraction efficiencies and angular sensitivities. In another embodiment, one or more of the three HOEs are switchable HOEs. By controlling an applied electric field across one or more of the switchable HOEs, its diffraction efficiency may be tuned. Having this tunability over the diffraction efficiency of individual color components allows color balancing in the output light 1930W. This tunability may be used to compensate for variations in the brightness of the three light sources, 1910R, 1910G, and 1910B. This controllability may also be used to generate different variations of white light in the output light 1930W. For example, in some applications, a white source with a greater component of red light may be desired. By applying an electric field to HOE 1920R so that its diffraction efficiency is increased, the resulting output light 1930W would be more red, as desired. Alternatively, all three light sources 1910R, 1910G, and 1910B could be run at maximum intensity during normal operation, and the intensities of 1910G and 1910B could be reduced to redden the output light 1930W.

It is noted simpler systems may involve fewer HOEs. For example, a system for combining two single-color source can be made of a reflection-type HOE placed in front of a mirror. In this system, the HOE is configured and aligned to diffract one of the colors into the output direction. Since the HOE's grating is specific for the first color, the second color of light passes through the HOE without substantial alteration. The second color is reflected from the mirror, back through the HOE, into the output direction.

Figures 20A, 20B:
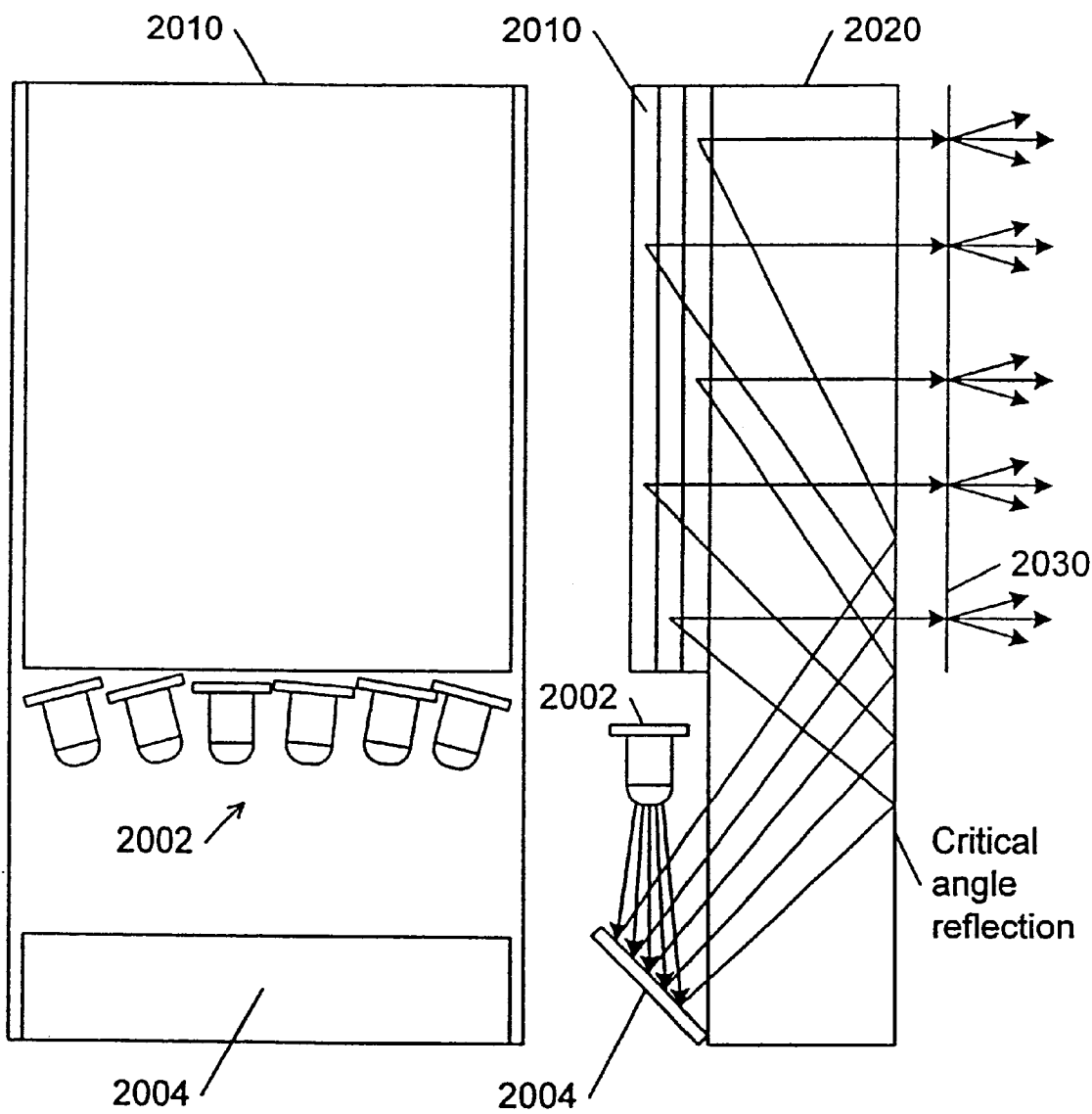
FIG. 20a and FIG. 20b show an alternate embodiment of a system using a stack of holographic optical elements to combine light of different colors.

FIG. 20*a* and FIG. 20*b* show another embodiment of the holographic illumination system. The system includes a series of LEDs 2002, a mirror 2004, a light guide 2020, a reflective HOE stack 2010 and a diffuser 2030. Mirror 2004 reflects light from the array of LEDs 2002 into light guide 2020. Light guide 2020 is configured to illuminate HOE stack 2010 with the reflected light. The HOEs in HOE stack 2010 collimate the light and direct the light onto diffuser 2030, from where it could, for example, be coupled to the surface of a reflective display by means of a beam splitter. In the example illustrated in FIG. 20*a* and FIG. 20*b*, HOE stack 2010 is mounted onto the back of light guide 2020. In this embodiment, light guide 2020 receives three colors of light from LEDs 2002 through a back surface and reflects the light from a front surface onto HOE stack 2020. This reflection may be a total internal reflection or it may be achieved by silvering or partially silvering a portion of the front surface of light guide 2020. In the depicted embodiment, HOE stack 2010 includes three reflection-type HOEs that are each configured to diffract one of the three colors of light. The geometry of the fringes (i.e., refractive index modulation) in each HOE is such that that the diffracted light emerges from each section of the HOEs on substantially parallel paths. The diffracted light is thus effectively collimated. The diffracted light from HOE stack 2010 propagates back through light guide 2020 onto diffuser 2030, which is mounted on or adjacent to the front surface of light guide 2020. In other embodiments, different optical path geometries may be used by designing light guide 2020 accordingly.

LEDs 2002 are preferably bright light sources with high output power concentrated into a narrow bandwidth. HOE stack 2010 is configured to combine different color components of light from the different LEDs into a substantially uniform white light and to provide this white light to diffuser 2030. The individual LEDs are aligned so that their light is incident on HOE stack 2010 at the appropriate angles of incidence.

In other embodiments, LEDs 2002 may be replaced by other illumination sources, such as laser diodes, halogen lamps, incandescent lamps, induction lamps, arc lamps, or others, or combinations thereof. These sources may be monochromatic or broad band. Also, it is noted that HOE stack 2010 may be comprised of transmissive HOE elements instead of reflective HOE elements. One example of an alternative embodiment is shown in FIG. 21.

FIG. 21: Illumination System with Transmissive HOEs

Figure 21A:
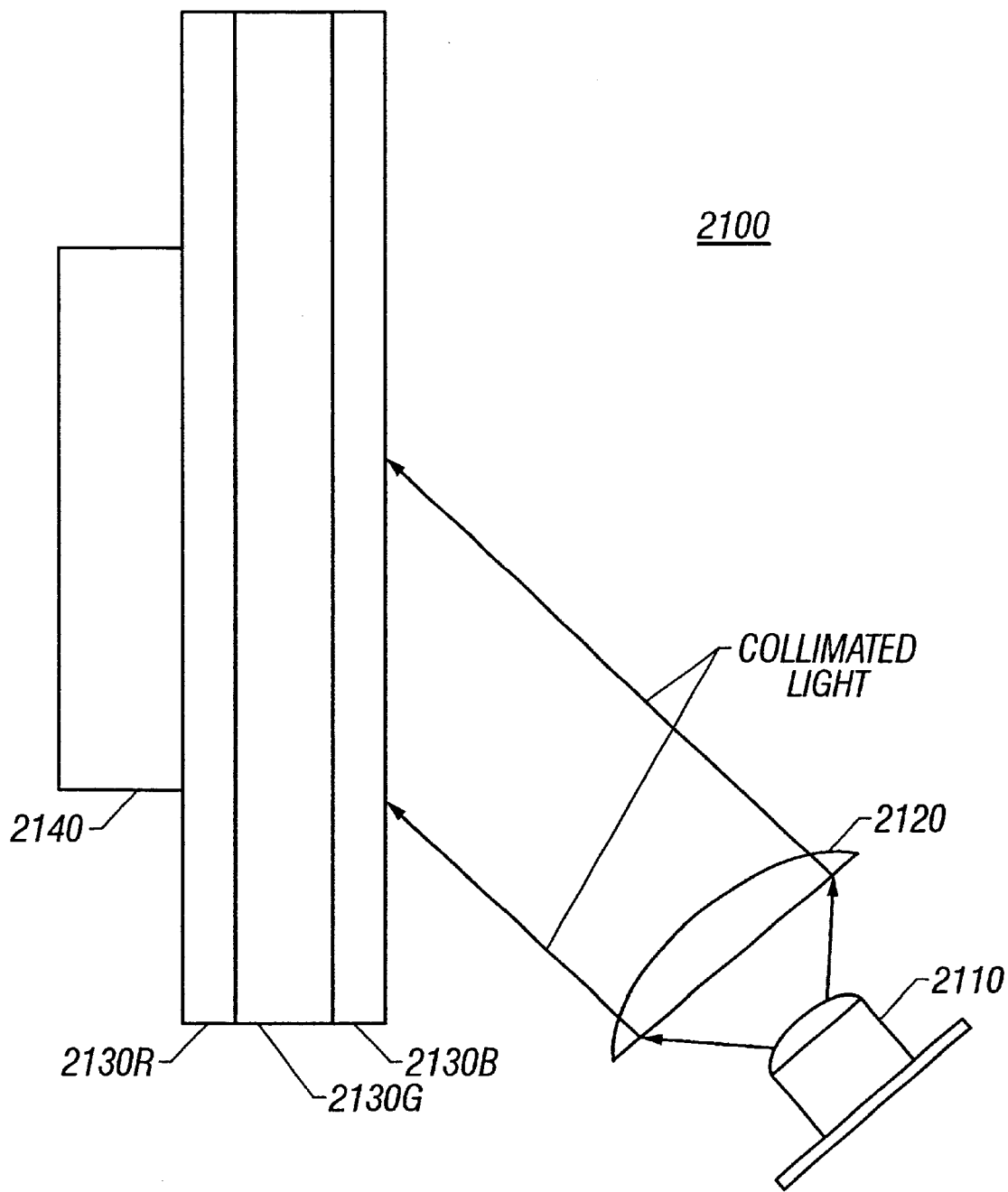
FIG. 21a shows an embodiment of a system using a stack of transmissive holographic optical elements to illuminate an image display.

Another embodiment of an illumination system 2100 using holographic optical elements is shown in FIG. 21*a*.

The illumination system comprises a light source 2110, a collimating lens 2120, and a transmissive HOE stack 2130 used in illuminating a reflective type image display 2140. The combination of the HOE stack 2130 and display 2140 may be used, for example, in an image projection device with limited space.

In one embodiment stack 2130 includes at least three transmissive type switchable HOEs. Each of the HOEs 2130R-213B may be individually switchable between the active state and inactive state in accordance with a voltage provided thereto. In this embodiment, each of the HOEs may include a polymer dispersed liquid crystal material layer sandwiched between a pair of light transparent and electrically conductive layers, the combination of which is sandwiched between a pair of light transparent and electrically nonconductive layers. Alternatively, the HOEs may be switchable between the active and inactive state as a group. In this embodiment, the HOEs 2130R-2130G may include three distinct polymer dispersed liquid crystal material layers sandwiched between a pair of light transparent and electrically conductive layers, the combination of which is sandwiched between a pair of light transparent and electrically nonconductive layers. Further description of HOEs 2130R-2130G may be found in U.S. patent application Ser. No. 09/478,150 entitled Optical Filter Employing Holographic Optical Elements And Image Generating System Incorporating The Optical Filter, filed Jan. 5, 2000, U.S. patent application Ser. No. 09/533,120 entitled Method And Apparatus For Illuminating A Display, filed Mar. 23, 2000, or U.S. patent application Ser. No. 09/675,431 entitled Inspection Device, filed Sep. 29, 2000, each of which is incorporated herein by reference. In another embodiment, HOE stack 2130 may contain nonswitchable HOEs.

In this embodiment, light source 2110 is a substantially broad band white-light source, such as an incandescent lamp, an induction lamp, a fluorescent lamp, or an arc lamp, among others. In other embodiments, light source 2110 may be a set of single-color sources with different colors, such as red, green, and blue. These sources may be LEDs, laser diodes, or other monochromatic sources.

Display 2140 is mounted on the opposite side of HOE stack 2130 from light source 2110. Display 2140 may take form in one or many embodiments. The image display may take form in a reflective microdisplay such as a reflective micro LCD on silicon with active TFT (thin-film transistor) control elements that maintain the intensity status of the pixels between each refresh of the screen. The image display may take form in a light reflective micro-mirror or a MEMS device that repositions miniature reflective elements to control the intensity of a pixel. Exemplary micro-mirror devices are marketed under the name Digital Light Processor by Texas Instruments, Inc. The image display may also take form in one of the emerging range of diffractive devices, an exemplary one of which is marketed under the name Grating Light Valve by Silicon Light Machines, Inc. In other embodiments, display 2140 is a transmissive display, and the optical arrangement of the illumination system may be configured to include two stacks of switchable transmissive HOEs with a polarization rotator positioned between or several stacks of reflective type HOEs.

In system 2100, HOE stack 2130 is positioned directly in front of the image display. Illumination light from source 2110 is collimated by lens 2120 and received by HOE stack 2130 at an appropriate incidence angle. One or more components of the collimated illumination light are subsequently diffracted toward display 2140 by one or more of the HOEs in HOE stack 2130. As noted above, HOE stack 2130 contains transmissive type HOEs. Transmissive type HOEs are configured to diffract the p-polarized component of illumination light when active while transmitting the s-polarized component of illumination light with no or substantially no alteration. Alternatively, it may be possible to employ transmissive HOEs which are configured to diffract the s-polarized component of the illumination light when active while transmitting the p-polarized component of the illumination light with no or substantially no alteration. The present invention will be described with reference to transmissive type HOEs which diffract p-polarized light when active while transmitting s-polarized light with no or substantially no alteration. "Without alteration" is defined to mean but is not limited to mean without diffraction, intensity modulation, and/or phase modulation.

Figure 21B:
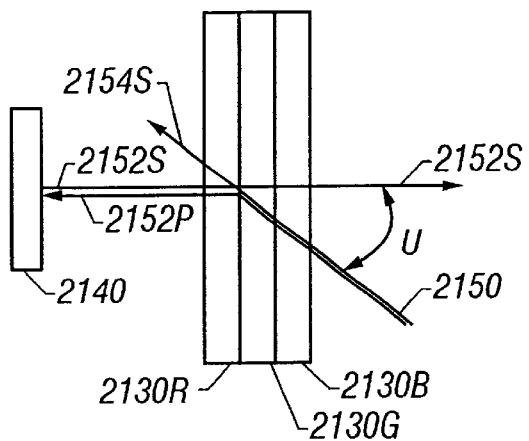
Figure 21C:
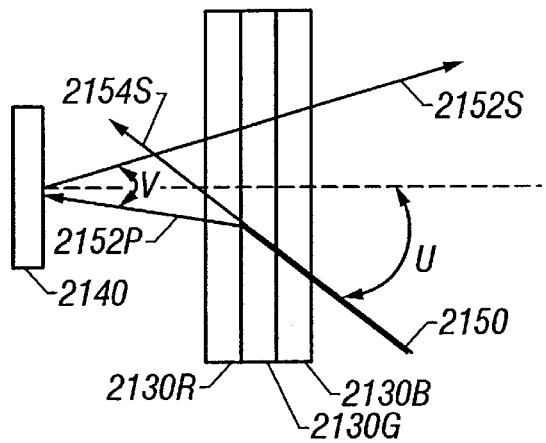
Figure 21D:
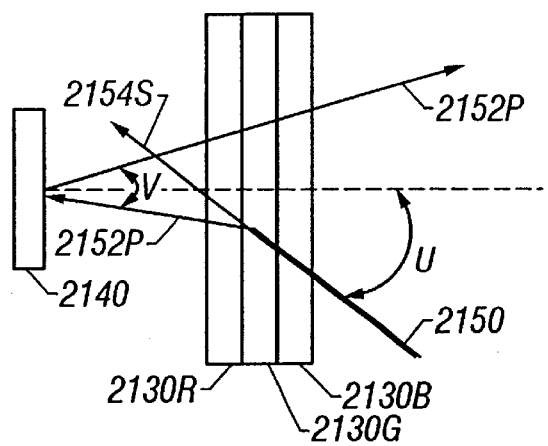

FIGS. 21b through 21d illustrate operational aspects of the illumination system 2100 shown in FIG. 21a. FIGS. 21b and 21c show the illumination system 2100 in which display 2140 takes form in a reflective microdisplay, such as the reflective micro-LCD described above. FIG. 21d shows the illumination system 2100 in which display 2140 takes form in a reflective micro-mirror. The displays 2140 in FIGS. 21b–21d reflect and modulate illumination light incident therein to produce image light. This illumination light is modulated in accordance with image information provided to display 2140. Stated differently, the illumination light is reflected by display 2140 with an inscribed image. The microdisplays of FIGS. 21b and 21c rotate the polarization of light incident thereon. The micro-mirror of FIG. 21d does not rotate the polarization of light incident thereon.

FIGS. 21b–21d will be described with HOE stack 2130 comprising individually switchable transmissive type HOEs 2130R-2130B that, when active, diffract the p-polarized red, green, and blue bandwidth components, respectively, of the collimated illumination light while transmitting the s-polarized red, green, and blue components of the collimated illumination light. In one embodiment, all p-polarized light diffracted by the HOEs 2130R-2130B, emerge from the back surface with substantially equal exit angles. In another embodiment, p-polarized light diffracted by the HOEs 2130R-2130B, emerge from the back surface with substantially different exit angles. As an example of this latter embodiment, each of the HOEs 2130R-2130B may function like a conventional lens and focus collimated illumination light onto image display 2140 by diffraction when active. In other words, each of the HOEs 2130R-2130B embody optical power when active. Use of such HOEs 2130R-2130B with optical power enables a better match between the angular distribution of light energy from source 2110 to acceptable angles of an LCD display 2140. LCD displays, it is noted, will reflect light more efficiently if the light is incident on the LCD within a set range of angles. A more efficient reflection of light translates into production of a brighter image by the LCD.

Although not shown, HOE 2130R may be one HOE of a group of HOEs configured to focus collimated red bandwidth light by diffraction when active, where each of the HOEs of the group has a different optical power when active; HOE 2130G may be one HOE of a group of HOEs configured to focus collimated green bandwidth light by diffraction when active, where each of the HOEs of the group has a different optical power, and; HOE 2130B may be one HOE of a group of HOEs configured to focus collimated blue bandwidth light by diffraction when active, where each of the HOEs of the group has a different optical power. Each of the groups of HOEs would be stacked like pancakes, and individually controlled.

In the inactive state, each of the HOEs in stack 2130 transmits substantially all of the collimated light without substantial alteration. The percentage of p-polarized light diffracted by any of the HOEs 2130R-2130B into first order diffracted light depends on the magnitude of the voltage applied between the electrically conductive and light transparent layers mentioned above. Accordingly, by adjusting the magnitude of the voltage applied to each of the HOEs 2103R-2130B, the system provides a means for color balancing the illumination light obtained from light source 2110. All three HOEs 2130R-2130B can be activated concurrently, or the HOEs 2130R-2130B can be activated sequentially and cyclically. In the latter embodiment, each of HOEs 2130R-2130B is activated one at a time in sequence, and display 2140 cycles through blue, green, and red components of an image to be displayed. HOE stack 2130 is switched synchronously with the image on display 2140 at a rate that is fast compared with the integration time of the human eye (less than 100 microseconds). In this manner, the system thus uses a single monochromatic display 2140 to provide a color image.

FIGS. 21b–21d will be described with reference to HOE 2130R operating in the active state and HOEs 2130G and 2130B operating in the inactive state. In FIG. 21b, the p-polarized red bandwidth component 2152P of collimated illumination light 2150 is diffracted by HOE 2130R while the s-polarized red bandwidth component 2152S is transmitted without substantial alteration. Diffracted light 2152P is reflected and polarization rotated into s-polarized red bandwidth image light 2152S by display 2140. Since image light 2152S is s-polarized, image light 2152S passes through all HOEs 2130R-2130B with no or substantially no alteration. Image light 2152S transmitted through HOE stack 2130 may be projected by standard projection optics (not shown) for viewing by a user. The diffraction gratings within the polymer dispersed liquid crystal layers of the HOEs and/or the angle U at which illumination light is received by HOE stack 2130 can be arranged so that image and illumination lights 2152S and 2152P, respectively, are normal to the surfaces of the display device 2140 and HOEs 2130R-2130B. The remaining components of illumination light 2150 which are not diffracted, including 2154S, if reflected by display 2140 emerge therefrom at an angle different from image light 2152S. Because this zero order light (i.e., undiffracted light) has a different emergence angle, it can be trapped or otherwise disposed of so that it doesn't interfere with the image light 2152S. As noted above, the percentage of p-polarized illumination light diffracted by an activated HOE depends on the magnitude of the voltage applied thereto. The percentage of p-polarized light illumination diffracted by an activated HOE also depends on the angle U at which the HOE receives the illumination light. If angle U is between 50–60 degrees or below this range of angles, than substantially all of the p-polarized illumination light is diffracted. However, the percentage of the p-polarized illumination light diffracted by the HOE will decrease substantially as angle U is increased beyond the 50–60 degree range.

FIG. 21c is substantially similar to FIG. 21b. However, unlike FIG. 21a, diffracted p-polarized illumination light 2152P is received by display 2140 at a non-zero angle measured with respect to the normal axis of the display surface. As such, the reflected s-polarized image light 2154S emerges from the display 2140 at a non-zero angle measured with respect to the normal axis of the display surface. However, image light 2152S is s-polarized and passes through HOE stack 2130 with no or substantially no alteration. The remaining components of illumination light 2150 which are not diffracted, including 2154S, if reflected by display 2140 emerge therefrom at an angle greater than the emergence angle of image light 2152S. Because this zero order light (i.e., undiffracted light) has a greater emergence angle, it can be trapped or otherwise disposed of so that it doesn't interfere with the image light 252S.

FIG. 21d is similar to FIG. 21c. However, the display device 2140, as noted above, does not rotate the polarization of the illumination light incident thereon. Accordingly, p-polarized image light 2156P emerges from display 2140. However, if the angle V between p-polarized image light 2156P and p-polarized illumination light 2152P is greater than the Bragg-diffraction angular bandwidth of HOEs 2130R-2130B, than image light 2156P will pass through HOEs 2130R-2130B with no or substantially no alteration.

Figure 22:
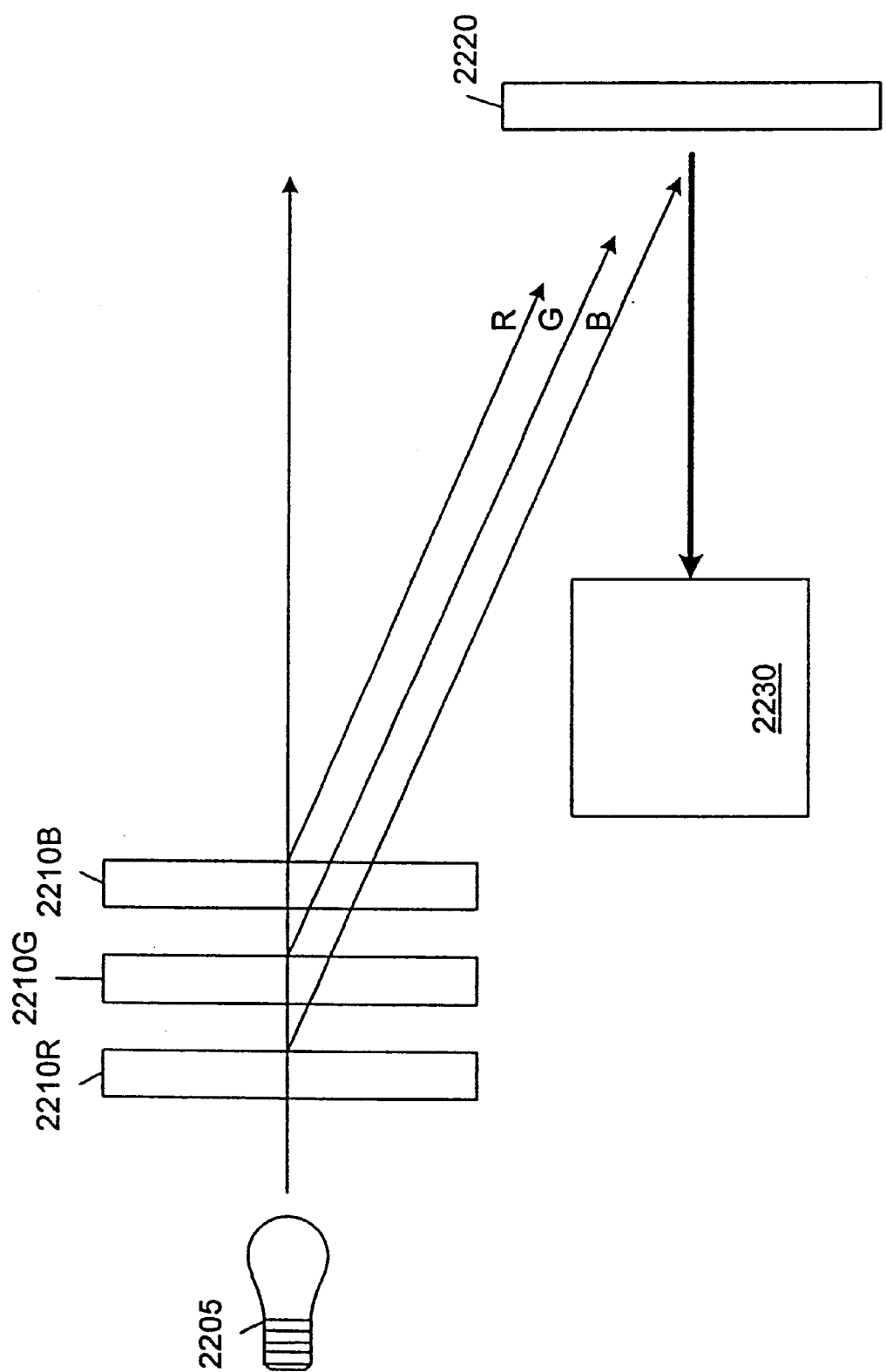
FIG. 22 shows an embodiment of a system in which a stack of transmissive switchable holographic optical elements is used to balance the color intensity in an illumination source for a color-sequenced image display.

FIG. 22: Color Separation and Color Balancing

FIG. 22 shows a system for separating white light into individual color components. The system comprises three HOE elements 2210R, 2210G, and 2210B capable of diffracting red, green, and blue light, respectively. The HOEs are illuminated with light from a polychromatic or broad band light source 2205. Each of the HOEs diffracts one of the color components from light source 2205 toward a display 2220. Light reflected from 2220 is then coupled into a projection system 2230.

HOE elements 2210R, 2210G, and 2210B are switchable HOES. They are turned on one at a time in sequence so that display 2220 is sequentially illuminated by blue, green, and red light. Display unit 2220 is also switched so that it sequentially displays one of the three color components of a desired image. The switching of HOEs 2210, 2210G, and 2210B is synchronous with the switching of display 2220 and is done at a rate faster than an eye-integration time. Thus, the projected image is a composite color image generated by a single monochromatic display 2220.

It is noted that instead of using HOEs tuned for red, green, and blue light (the nominal color bands of the three types of cones in the human eye), other combinations may be used as appropriate for the application. In general, any set of color components can be used that spans the appropriate color space. One example is the cyan, yellow, and magenta combination used in some printing applications.

The switchable HOEs in the embodiments described above may be Bragg-type elements in order to provide a high diffraction efficiency. However, thin phase switchable HOEs may also be employed, although thin phase HOEs may not provide a high level of diffraction efficiency when compared to Bragg type HOEs. Moreover, it is understood that with appropriate changes in the optical arrangements, reflective-type switchable HOEs may be employed in place of transmissive-type switchable HOEs, and vice-versa. Similarly, reflective-type nonswitchable HOEs may be employed in place of transmissive-type nonswitchable HOEs, and vice-versa.

In the examples illustrated above, some conventional optical elements may be required to correct aberrations introduced by the HOEs and other optical elements. Since these corrective elements do not impact the basic functional description of the systems, they have been omitted for simplicity. It is noted that HOEs may also be used in some embodiments of these systems to correct optical aberrations.

What is claimed is:

1. A method comprising:
   a first electrically switchable holographic optical element (ESHOE) receiving illumination light;
   the first ESHOE focusing a first component of the illumination light onto an image display while transmitting the remaining components of the illumination light without substantial alteration;

the image display receiving the focused first component light;

image light emitting from the image display in response to the image display receiving the focused first component;

the first ESHOE receiving and transmitting the image light without substantial alteration.

2. The method of claim 1 wherein the first ESHOE comprises oppositely facing front and back surfaces, wherein the focused first component light emerges from the first ESHOE at the back surface thereof, wherein the first ESHOE receives the image light at the back surface thereof, and wherein the first ESHOE transmits the received image light without substantial alteration.

3. The method of claim 1, wherein the first ESHOE operates between an active state and an inactive state, wherein the first ESHOE, when operating in the active state, focuses the first component of the illumination light by diffraction while transmitting the remaining components of the illumination light without substantial alteration, wherein the first ESHOE, when active, transmits the image light without substantial alteration, and wherein the first ESHOE, when operating in the inactive state, transmits the illumination light including the first component thereof without substantial alteration.

4. The method of claim 1 wherein the image display modulates the focused first component light in accordance with image information provided to the image display to produce the image light.

5. The method of claim 1 wherein the image light has a polarization state that is orthogonal to the polarization state of the focused first component light.

6. The method of claim 1 wherein the first ESHOE comprises a holographic recording medium that records a hologram, wherein the holographic recording medium comprises:

a monomer dipentaerythritol hydroxypentaacrylate;

a liquid crystal;

a cross-linking monomer;

a coinitiator; and a photoinitiator dye.

7. The method of claim 1 wherein the first ESHOE comprises a hologram made by exposing an interference pattern inside a polymer-dispersed liquid crystal material, the polymer-dispersed liquid crystal material comprising, before exposure:

a polymerizable monomer;

a liquid crystal;

a cross-linking monomer;

a coinitiator; and a photoinitiator dye.

8. An apparatus comprising:

a first electrically switchable holographic optical element (ESHOE) for receiving illumination light, wherein the first ESHOE is configured to focus a first component of the illumination light while transmitting the remaining components of the illumination light without substantial alteration;

an image display for receiving the focused first component, wherein the image display is configured to emit image light in response to the image display receiving the focused first component;

wherein the first ESHOE is configured to receive and transmit the image light without substantial alteration.

9. The apparatus of claim 8 wherein the first ESHOE comprises oppositely facing front and back surfaces, wherein the focused first component emerges from the first ESHOE at the back surface thereof, wherein the first ESHOE is configured to receive the image light at the back surface thereof, and wherein the first ESHOE transmits the image light without substantial alteration.

10. The apparatus of claim 8 wherein the first ESHOE operates between an active state and an inactive state, wherein the first ESHOE, when operating in the active state, focuses the first component of the illumination light by diffraction while transmitting the remaining components of the illumination light without substantial alteration, wherein the first ESHOE, when active, transmits the image light without substantial alteration, and wherein the first ESHOE, when operating in the inactive state, transmits the illumination light including the first component thereof without substantial alteration.

11. The apparatus of claim 8 wherein the image display is configured to modulate the focused first component in accordance with image information provided to the image display.

12. The apparatus of claim 8 wherein the image light has a polarization state that is orthogonal to the polarization state of the first focused component.

13. The apparatus of claim 8 wherein the first ESHOE comprises a holographic recording medium that records a hologram, wherein the holographic recording medium comprises:

a monomer dipentaerythritol hydroxypentaacrylate;

a liquid crystal;

a cross-linking monomer;

a coinitiator; and a photoinitiator dye.

14. The apparatus of claim 8 wherein the first ESHOE comprises a hologram made by exposing an interference pattern inside a polymer-dispersed liquid crystal material, the polymer-dispersed liquid crystal material comprising, before exposure:

a polymerizable monomer;

a liquid crystal;

a cross-linking monomer;

a coinitiator; and a photoinitiator dye.

* * * * *